(12) United States Patent
Woodard, Jr. et al.

(10) Patent No.: US 10,533,840 B2
(45) Date of Patent: Jan. 14, 2020

(54) METHOD FOR CHARACTERIZING SHAPE CHANGES OF AN AIRCRAFT DUE TO FLIGHT LOADS

(71) Applicant: Gulfstream Aerospace Corporation, Savannah, GA (US)

(72) Inventors: Roy Linwood Woodard, Jr., Statesboro, GA (US); Todd Schartner, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 43 days.

(21) Appl. No.: 15/961,785

(22) Filed: Apr. 24, 2018

(65) Prior Publication Data

US 2019/0323826 A1 Oct. 24, 2019

(51) Int. Cl.
*G01B 11/16* (2006.01)
*B64D 45/00* (2006.01)
*G06T 17/20* (2006.01)

(52) U.S. Cl.
CPC .............. *G01B 11/16* (2013.01); *B64D 45/00* (2013.01); *G06T 17/20* (2013.01); *G06T 2207/10028* (2013.01); *G06T 2207/30268* (2013.01)

(58) Field of Classification Search
CPC ...................................................... G01B 11/16
USPC ........................................................... 356/32
See application file for complete search history.

(56) References Cited

U.S. PATENT DOCUMENTS

| | | | |
|---|---|---|---|
| 8,744,133 B1 | 6/2014 | Troy | |
| 8,756,085 B1 | 6/2014 | Plummer et al. | |
| 9,804,577 B1 * | 10/2017 | Troy | G05B 15/02 |
| 2009/0022382 A1 * | 1/2009 | Feilkas | G06T 7/20 |
| | | | 382/131 |
| 2010/0097180 A1 * | 4/2010 | Cardullo | G06Q 20/40145 |
| | | | 340/5.83 |
| 2014/0132728 A1 * | 5/2014 | Verano | G06K 9/00771 |
| | | | 348/46 |
| 2015/0009214 A1 * | 1/2015 | Lee | G06T 17/10 |
| | | | 345/420 |
| 2016/0368220 A1 * | 12/2016 | Dimatteo | G05B 19/4099 |

(Continued)

OTHER PUBLICATIONS

Robert Kayen, et al., Proceedings of the 8th U.S. National Conference on Earthquake Engineering, Apr. 18-22, 2006, San Francisco, California, Paper No. 1587.

(Continued)

*Primary Examiner* — Tarifur R Chowdhury
*Assistant Examiner* — Omar H Nixon
(74) *Attorney, Agent, or Firm* — LKGlobal | Lorenz & Kopf, LLP

(57) ABSTRACT

Methods for characterizing shape changes of an aircraft due to flight loads are provided. In one example, a method for characterizing shape changes of an interior portion of an aircraft from flight loads includes positioning one or more 3D scanners within the interior portion of the aircraft. A reference scan of the interior portion is created with the one or more 3D scanners while the aircraft is substantially stationary and/or on the ground. A deformed scan of the interior portion is created with the one or more 3D scanners while the aircraft is in flight subject to substantial flight loads. The reference scan and the deformed scan are post-processed and analyzed to characterize the shape changes of the interior portion of the aircraft from the substantial flight loads.

20 Claims, 38 Drawing Sheets

(56) References Cited

U.S. PATENT DOCUMENTS

| | | | |
|---|---|---|---|
| 2017/0116782 A1 | 4/2017 | Noh et al. | |
| 2017/0243397 A1* | 8/2017 | Hou | G06K 9/6209 |
| 2017/0259943 A1* | 9/2017 | Fleck | B64D 45/00 |
| 2018/0018764 A1* | 1/2018 | Glatfelter | G06T 7/0004 |
| 2018/0170540 A1* | 6/2018 | Claybrough | G05D 1/0094 |

OTHER PUBLICATIONS

FARO Technologies Inc., FARO Laser Scanner Focus 3D x 330, Product Brochure, Oct. 2013.

Chiara Villa, et al., Surface Curvature of Pelvic Joints from Three Laser Scanners: Separating Anatomy from Measurement Error, Journal of Forensic Sciences, Technical Note, Mar. 2015, vol. 60, No. 2.

Brian K. Brashaw, et al., Laser Scanning Technology as Part of a Comprehensive Condition Assessment for Covered Bridges, United States Department of Agriculture, Research Note FPL-RN-0335, Jun. 2015.

Luis Ramos-Alcazar, et al., Comparing Dam Movements Obtained with Terrestrial Laser Scanner (TLS) Data Against Direct Pendulums Records, University of Antioquia Engineering Faculty Magazine (REDIN), Jun. 9, 2015, No. 76, pp. 99-106, 2015.

Patricia Flatley Brennan, et al., Visualizing Living and Working Spaces: Proof of Concept for a Biomedical Space-Replication Methodology, University of Wisconsin-Madison, Journal of Biomedical Informatics 57 (2015) 53-61, Jul. 11, 2015.

Elwira Holowko, et al., Application of Multi-Resolution 3D Techniques in Crime Scene Documentation with Bloodstain Pattern Analysis, Forensic Science International 267 (2016) 218-227, Sep. 9, 2017.

Qianlong Yang, et al., Development of Laser Scanner for Full Cross-Sectional Deformation Monitoring of Underground Gateroads, MDPI Article, Jun. 7, 2017.

FARO Technologies Inc., FARO Laser Scanner Focus 3D x 330, Product Information Sheet, Date Omitted.

Roderik Lindenbergh, et al., Structural Monitoring of Tunnels Using Terrestrial Laser Scanning, Paper, Date Omitted.

* cited by examiner

METHOD FOR CHARACTERIZING SHAPE CHANGES OF AN AIRCRAFT DUE TO FLIGHT LOADS

TECHNICAL FIELD

The technical field relates generally to shape changes that can occur to an aircraft during flight, and more particularly, relates to methods for characterizing shape changes, such as the magnitude and direction of the shape changes, of an interior portion of an aircraft from flight loads.

BACKGROUND

When designing an interior portion (e.g., cabin or other interior areas within the fuselage) of an aircraft, for example a business aircraft, aircraft manufacturers develop very refined designs to meet high customer expectations such as comfort, aesthetics, functionality, and the like. Many of these customers are accustom to luxury in their homes, automobiles, and lifestyles, and have high expectations for how their business jet looks and functions.

Further, to make an aircraft travel faster and further, aircraft manufacturers have optimized the structural designs to reduce weight of aircrafts. Weight is a primary metric used to track efficiency as a lighter aircraft takes less energy to accelerate quickly and travel further. Weight is often reduced by removing excess material or using special materials with a high strength-to-weight ratio. Detailed structural analysis is performed to ensure that the reduced weight design(s) will meet or exceed FAA strength requirements.

One potential consequence of reducing material in the structure design is increased flexibility of the aircraft including the aircraft's fuselage. Increased flexibility can be beneficial as a certain amount of flexibility in the aircraft structure can help to distribute loads and eliminate stress concentrations. An aircraft is designed to handle a variety of loads during flight including wing lift and internal cabin pressure. When an aircraft structure is flexible, the aircraft including the fuselage and cabin floor can change shape in response to these flight loads. However, when such shape changes occur, interior cabin furniture and/or hardware that is attached to the fuselage and cabin floor can move. Unfortunately, this can have a negative effect on the appearance and/or limit the performance of the interior cabin furniture and/or hardware. For example, unsightly gaps at door openings can result, causing light bleeding or door malfunctions.

Aircraft interior designers develop furniture and/or hardware designs to minimize these problems. Furniture or hardware assets are often attached to areas of the fuselage and cabin floor with minimum movement and incorporate overlap joints and brackets to maintain position during flight. However, sometimes these measures are not enough and shape changes from flight loads can cause problems for aircraft interiors. Knowing what interior features move including the magnitude and direction of such movement can help an aircraft designer to manage fuselage and cabin floor movements. One approach is to capture pictures of interior cabin features that deform during flight. Although pictures of deformed features and gaps that occur during flight can be helpful, such pictures typically provide limited quantitative feedback to the aircraft designer. Another approach is to take linear measurements during flight with tape measures, string potentiometers or the like to provide information about key points on the interior. Unfortunately, such data is also limited and provides one-dimensional information at just a few discrete locations.

Accordingly, it is desirable to provide improved method for characterizing shape changes of an interior portion of an aircraft from flight loads. Furthermore, other desirable features and characteristics of the various embodiments described herein will become apparent from the subsequent detailed description and the appended claims, taken in conjunction with the accompanying drawings and this background.

SUMMARY

Methods for characterizing shape changes of an aircraft due to flight loads provided herein. In accordance with an exemplary embodiment, a method for characterizing shape changes of an interior portion of an aircraft from flight loads includes positioning one or more 3D scanners within the interior portion of the aircraft. A reference scan of the interior portion is created with the one or more 3D scanners while the aircraft is substantially stationary and/or on the ground. A deformed scan of the interior portion is created with the one or more 3D scanners while the aircraft is in flight subject to substantial flight loads. The reference scan and the deformed scan are postprocessed and analyzed to characterize the shape changes of the interior portion of the aircraft from the substantial flight loads.

In another exemplary embodiment, a method for characterizing shape changes of an interior portion of an aircraft from flight loads includes determining scan locations within the interior portion of the aircraft. The interior portion is scanned with one or more 3D scanners positioned at the scan locations while the aircraft is substantially stationary and/or on the ground for creating a reference scan. The interior portion is scanned with the one or more 3D scanners positioned at the scan locations while the aircraft is in flight subject to substantial flight loads for creating a deformed scan. The reference scan and the deformed scan are postprocessed and analyzed to characterize the shape changes of the interior portion of the aircraft from the substantial flight loads.

BRIEF DESCRIPTION OF THE DRAWINGS

The various embodiments will hereinafter be described in conjunction with the following drawing FIGS., wherein like numerals denote like elements, and wherein.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Figure 1:
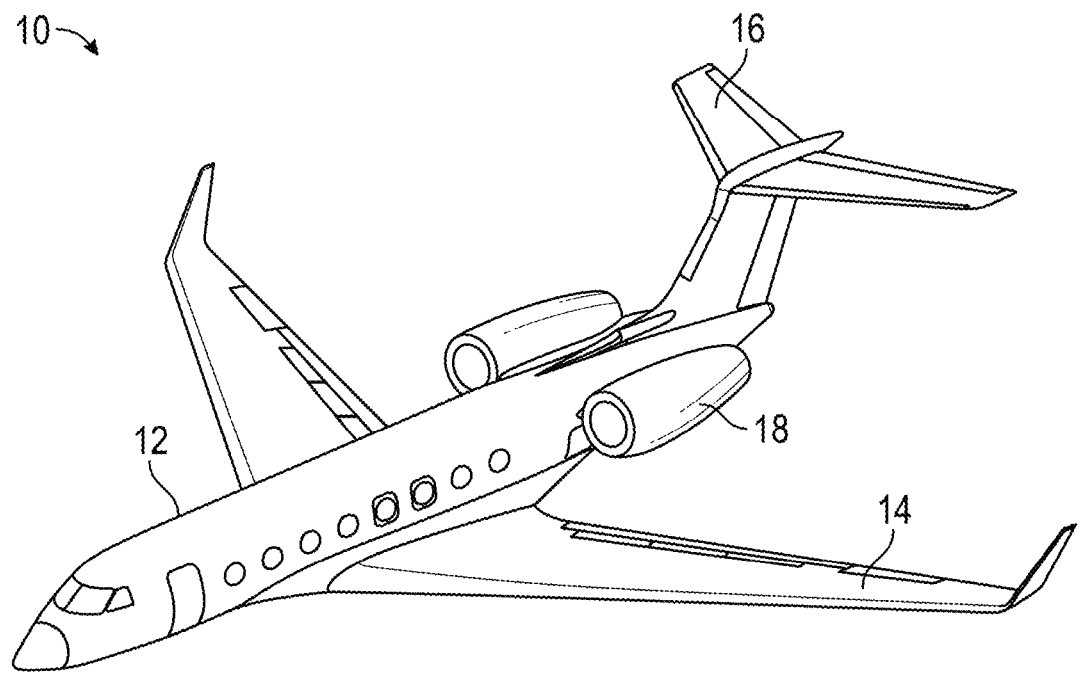
FIG. 1 illustrates a perspective view of an aircraft including an interior portion in accordance with an exemplary embodiment.
Figure 2:
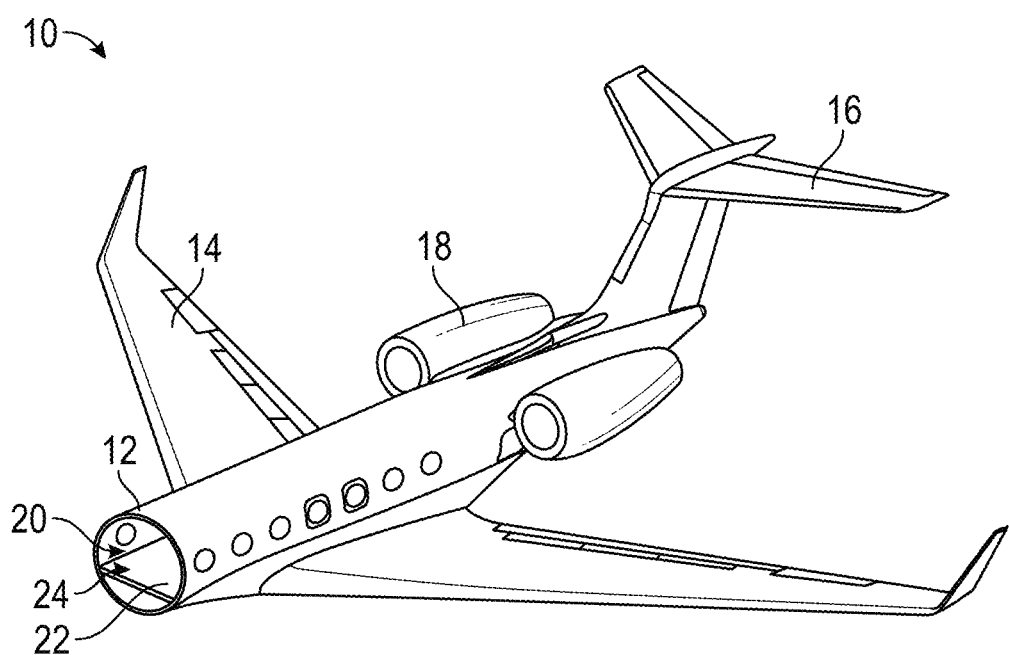
FIG. 2 is a cutaway view of the aircraft depicted in FIG. 1.

FIG. 1 illustrates a perspective view of an aircraft 10 in accordance with an exemplary embodiment. FIG. 2 illustrates a cutaway perspective view of the aircraft 10 depicted in FIG. 1. Referring to FIGS. 1-2, the aircraft 10 includes a fuselage 12 as the main body of the aircraft 10 that supports the wings 14 and tail 16. Depending on the design of the aircraft 10, the engines 18 may also be attach to the fuselage 12. The primary purpose of the fuselage 12 is to carry passengers and their cargo. As illustrated, a cabin 20 including a cabin floor 22 extends within an interior portion 24 of the fuselage 12.

In an exemplary embodiment, to make the cabin 20 more comfortable for passengers, when the aircraft 10 is flying above about 5000 feet, the cabin 20 is pressurized to simulate the air pressure at an altitude of about 5000 feet. As the altitude of the aircraft 10 increases above 5000 feet, outside air pressure decreases, but the inside cabin pressure of the aircraft 10 is regulated to stay at a relatively constant pressure (e.g., approximately pressure of air at about 5000 feet). As such, a pressure difference develops between the interior portion 24 of the fuselage 12 (e.g., cabin 20) and the outside atmosphere when the aircraft 10 is flying above about 5000 feet. In an exemplary embodiment, this pressure difference increases up to a maximum operating altitude of the aircraft 10, such as, for example, at an altitude of about 51,000 feet. In this example, the maximum pressure difference between the cabin 20 and the outside atmosphere at about 51,000 feet is about 11 pounds per square inch (psi).

Figure 3:
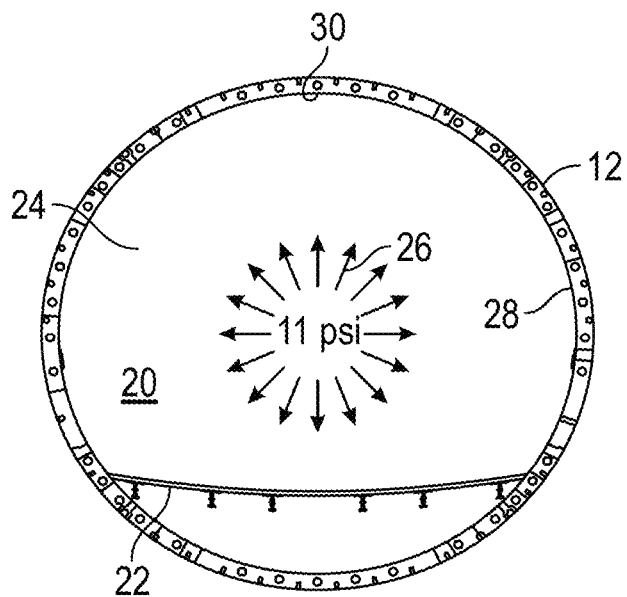
FIG. 3 is a cross-sectional view of a fuselage subject to an internal pressure difference causing the fuselage and cabin floor to change shape in accordance with an exemplary embodiment.

Referring to FIG. 3, when the pressure difference is substantial (e.g., at about 11 psi at an altitude of about 51,000 feet), there are significant forces or pressure 26 pushing outwardly on the inside cabin or fuselage walls 28 and cabin floor 22 of the fuselage 12. These forces or pressure 26 can cause the fuselage 12 and cabin floor 22 to deform. As illustrated, the cabin floor 22 bows downward, the sidewalls 28 of the fuselage bow outward, and the upper wall or ceiling section 30 (e.g., headliner area) of the fuselage 12 moves downward in response to the pressure difference between the air inside and outside of the aircraft 10.

Figure 4A:
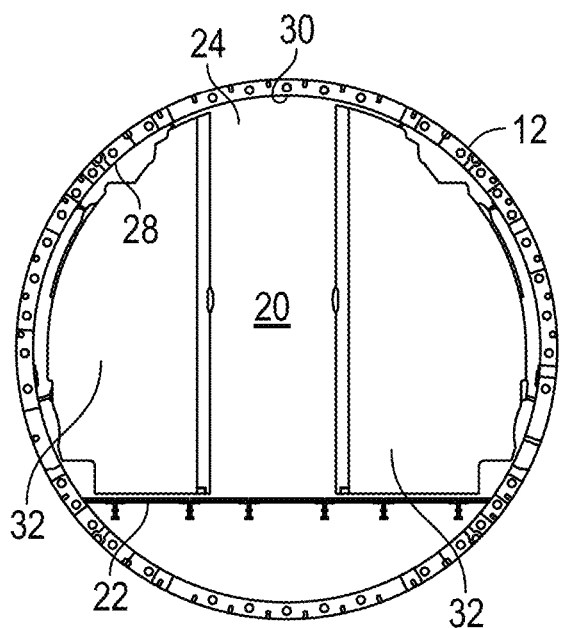
FIG. 4A is a cross-sectional view of a cabin in an un-deformed condition in accordance with an exemplary embodiment.
Figure 4B:
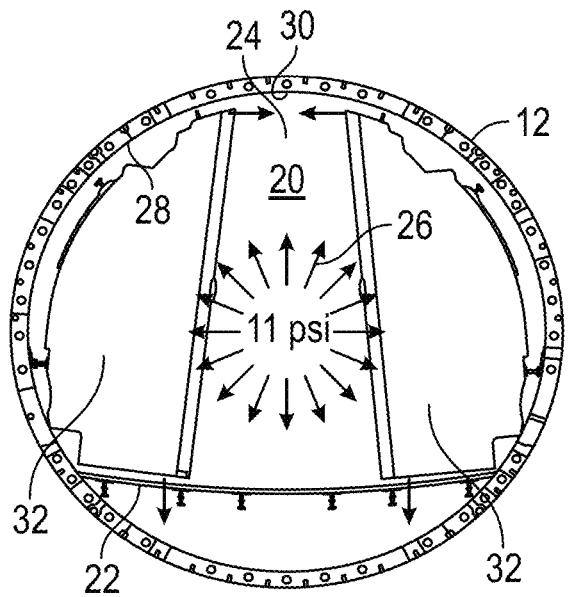
FIG. 4B is a cross-sectional view of a cabin in a deformed condition in accordance with an exemplary embodiment.

Referring also to FIGS. 4A-B, cabin furnishings 32 (e.g., furniture assets) are typically attached to the cabin floor 22, fuselage wall 28 (e.g., sidewalls and/or ceiling section), or both. Consequently, when the cabin floor 22 and/or fuselage walls 28 move due to pressure 26 or flight loads, the attached cabin furnishings 32 can move.

Figure 5:
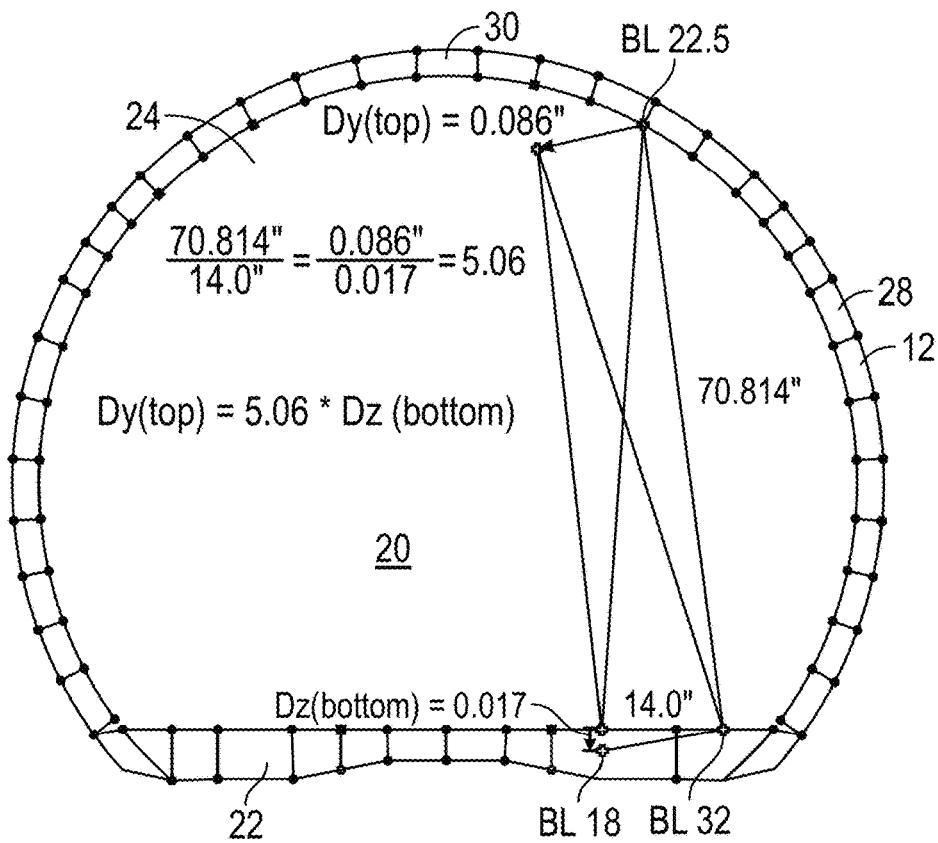
FIG. 5 illustrates a cross-sectional view of an interior portion of an aircraft in accordance with an exemplary embodiment.

Referring also to FIG. 5, in an exemplary embodiment, localized movement of the cabin floor 22 and/or fuselage walls 28 may be relatively small, for example from about 0.010 to about 0.250 inches, but the geometry of the cabin furnishings 32 and the attachment locations can have a magnifying effect. As illustrated in FIG. 5, a drop of about 0.017 inches of the inboard attachment of the cabin floor 22 for example can cause an inboard movement of the upper bulkhead (e.g., ceiling section 30) of about 0.086 inches.

Figure 6:
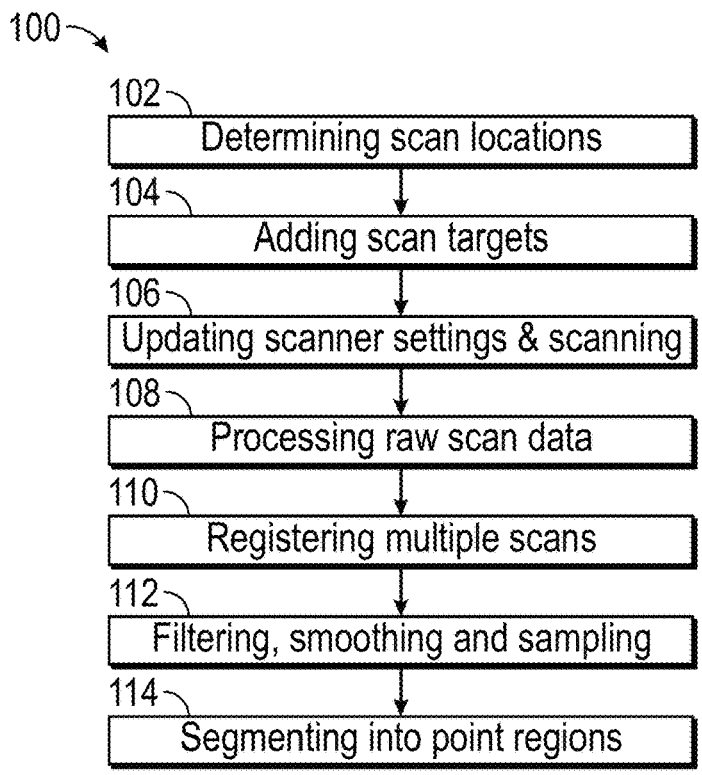
FIG. 6 illustrates a method for scanning an interior portion of an aircraft in accordance with an exemplary embodiment.

Referring to FIG. 6, in an exemplary embodiment, a method 100 for scanning (hereinafter "scanning process") is used to characterize the shape of the interior portion 24 of the aircraft 10. The scanning process 100 employs scan software and one or more non-contact 3-D scanners and includes a plurality of steps. A variety of scan software packages are commercially available including, for example, Geomagic Design X, which is made by 3D Systems Corporation, located in Rock Hill, S.C. In an exemplary embodiment and as will be discussed in further detail below, Geomagic Design X software is used during STEPS 110, 112, 114, 202, 204, 208, 210, and 212.

Non-contact 3D scanners are configured to capture a plurality of points on a surface of a subject being scanned (i.e. scan subject). The group of captured points is called a point cloud. When the points are sufficiently dense, they form the shape of the outer surface of the scan subject. The point cloud can be used to develop virtual surfaces that represent the surfaces of the scan subject. If the point cloud includes color, then that information can be applied or otherwise assigned to the surface for increased accuracy. A scan subject may need to be scanned multiple times from different directions to capture its overall geometry. As will be discussed in further detail below, registration is a process of combining multiple scans of a scan subject(s) to create a single larger point cloud.

A variety of non-contact 3D scanners are commercially available, but generally 3D scanners fit into one of three categories: time-of-flight scanners, phase shift scanners, and triangulation scanners. Time-of-flight scanner uses a laser to capture the surface points of the subject being scanned. The laser emits a pulse of light that travels to the scan subject and back. Using the precise speed of light (c) and the time it takes for the round trip (t), the distance between the scanner and the scan subject is calculated using Equation 1 (provided below). This type of scanner is especially effective for capturing large geometry over long distances. This type of 3D scanner is also known as a Light Detection and Ranging scanner, or LiDar scanner.

Equation 1:

$$\text{Distance} = \frac{ct}{2}$$

Figure 8:
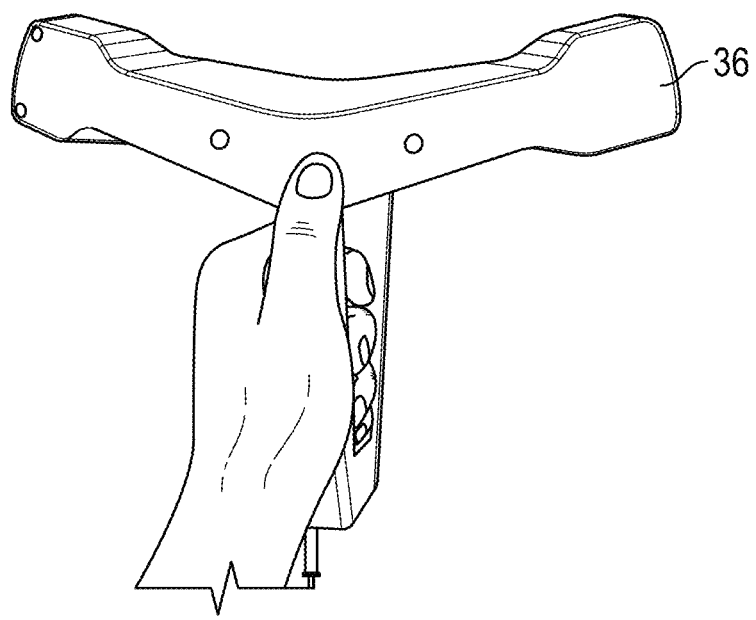
FIG. 8 illustrates a perspective view of an example of a triangulation 3D scanner.

A triangulation scanner uses a laser and a camera in combination. The laser illuminates on the scan subject and the camera records the location of the scan dot(s) on the scan subject. Using the triangle formed between the camera, laser, and the scan subject, the distance between the scanner and the scan subject is calculated. This process is repeated as the scanner is moved across the scan subject until an entire surface point cloud is captured. A triangulation scanner is very accurate and especially effective for scanning close to the scan subject. An example of a commercially available triangulation 3D scanner 36 is the Faro Freestyle shown in FIG. 8. A hand-held triangulation 3D scanner 36 like the Faro Freestyle (Faro, Lake Mary, Fla.) can be constantly moved, so the base position of the scanner is calculated using reference features on the surface of the subject being scanned.

Figure 7:
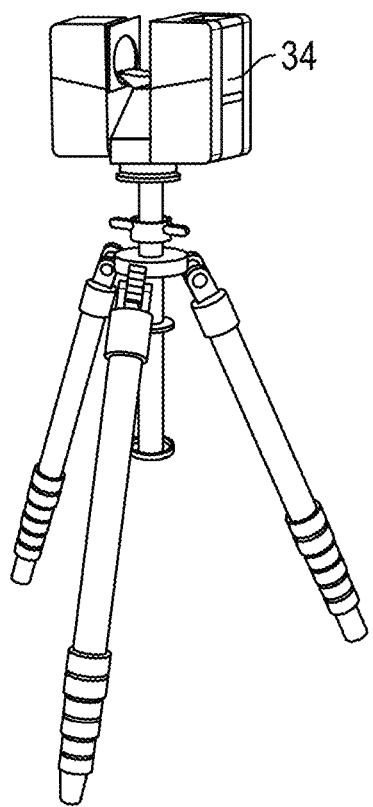
FIG. 7 illustrates a perspective view of an example of a phase shift 3D scanner.

A phase shift scanner measures distances using scattered laser light. Waves of laser light are transmitted from the source to the object being scanned. When the light is reflected back to the scanner, the phase shift in the light is measured to determine distance. Combining distance with the angle and position of the transmitted light, the coordinates of each scan point are determined. A phase shift scanner is useful for capturing detailed scans of large areas because it can capture as many as 100,000 points per sec. An example of a commercially available phase shift 3D scanner 34 is the Faro Focus x330 HDR (Faro, Lake Mary, Fla.) as shown in FIG. 7. This type of scanner is also called a Terrestrial Laser Scanner (TLS).

In an exemplary embodiment, the scanning process 100 includes determining scan locations (STEP 102) for positioning the 3D scanner(s) in the interior portion of the aircraft 10 for each scan. The 3D scanner (e.g., laser scanner) gathers information in its line of sight for the geometry of the scan subject, so multiple scans from multiple scan locations and directions may be appropriate to fully or substantially fully capture the subject being scanned.

Figure 9:
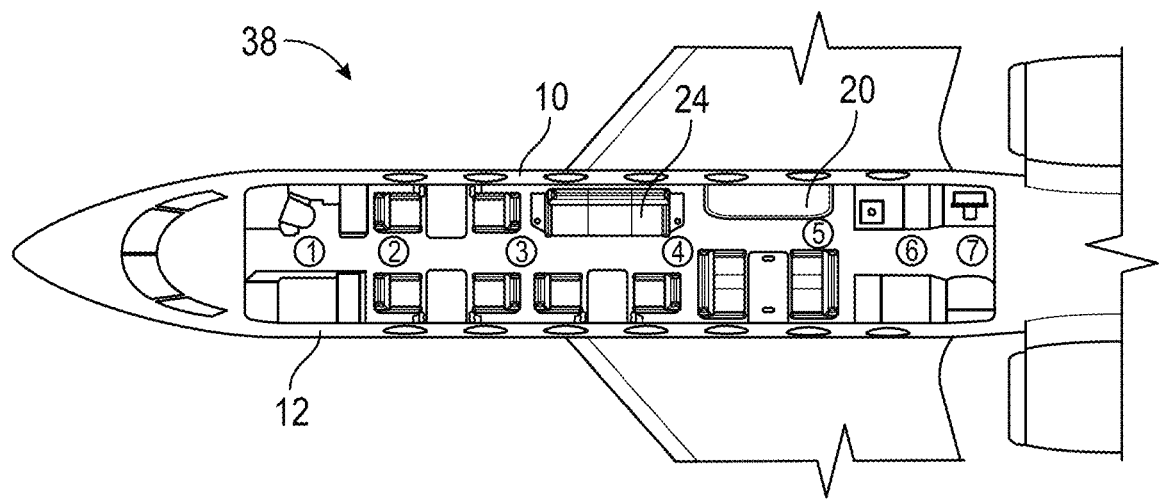
FIG. 9 illustrates a scan placement plan for positioning one or more 3D scanners in an interior portion of a fuselage of an aircraft in accordance with an exemplary embodiment.

Referring to FIG. 9, a non-limiting example of a scan placement plan 38 for positioning one or more 3D scanners at placement locations 1-7 in the interior portion 24 of the fuselage 12 of the aircraft 10 is provided. In an exemplary embodiment, positioning the one or more 3D scanners according to the scan placement plan 38 ensures relatively complete coverage of the surfaces in the cabin 20 (e.g., scan subject). Depending on what information is desirable, some or all of the positions indicated in the scan placement plan 38 may be used to fully or substantially fully capture the surfaces in the cabin 20.

Figure 10:
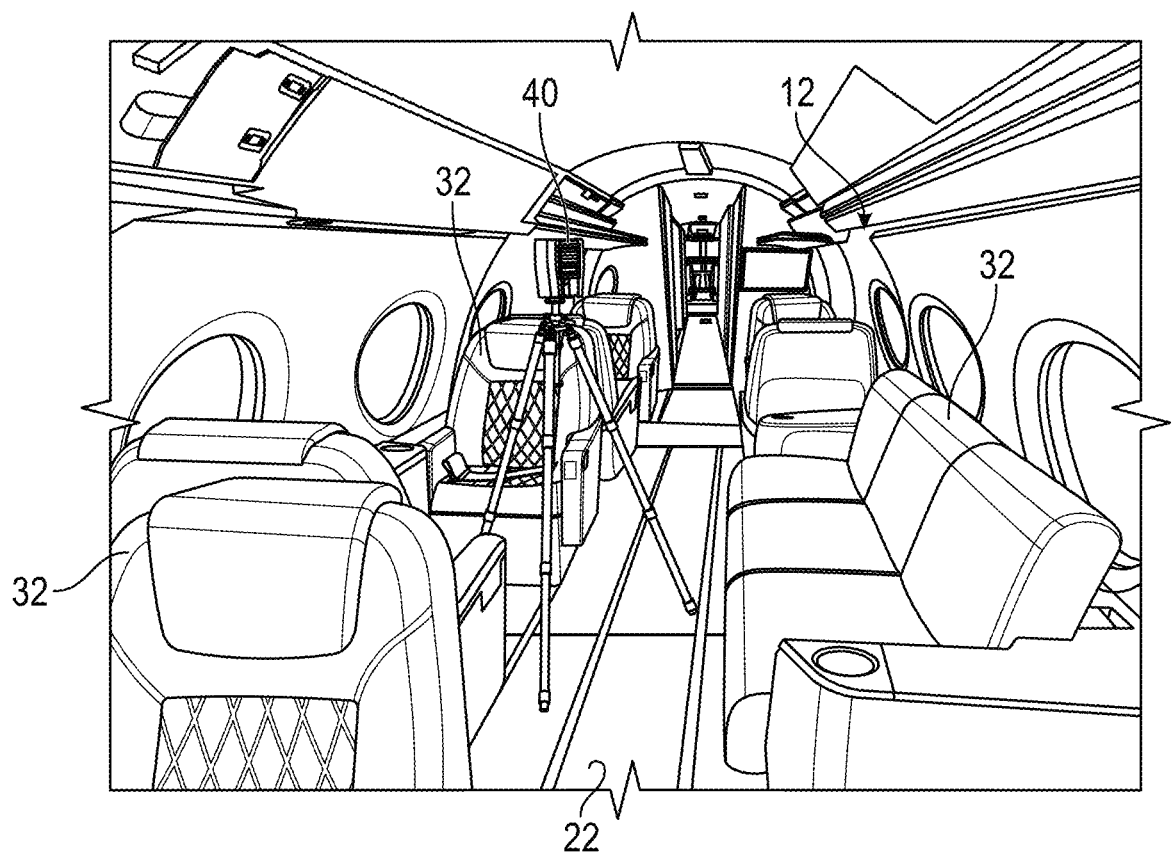
FIG. 10 illustrates a perspective view of a 3D scanner positioned proximate a center interior portion of a fuselage of an aircraft in accordance with an exemplary embodiment.

Referring also to FIG. 10, a 3D scanner 40 is shown positioned proximate the center of the fuselage 12 to capture data of the cabin floor 22 in both the fore and aft directions. Additionally, the 3D scanner 40 is positioned relatively high in the cabin 20 so that the upper portions of the cabin furniture 32 can also be scanned.

Figure 11:
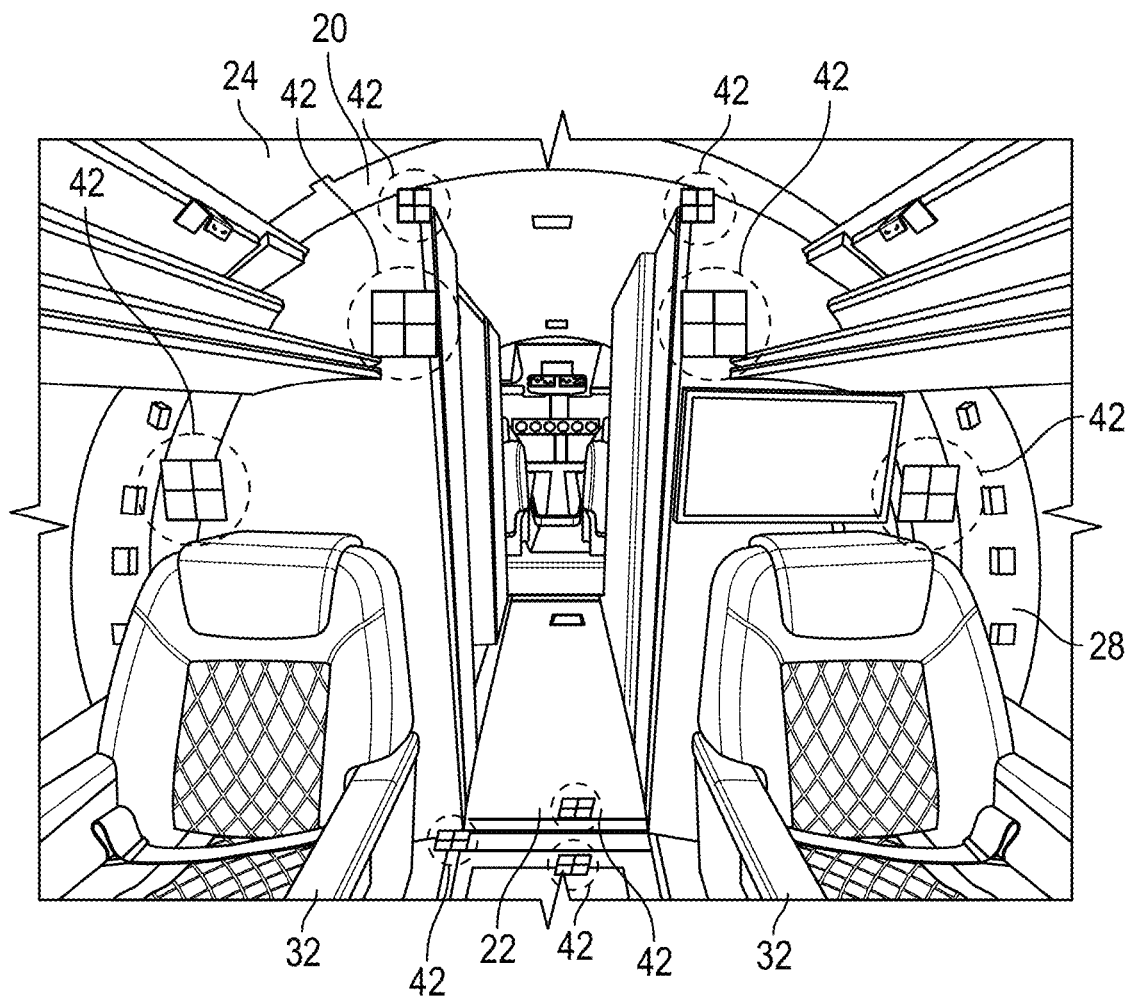
FIG. 11 illustrates a perspective view of scan targets positioned in an interior portion of a fuselage of an aircraft in accordance with an exemplary embodiment.

Referring again to FIG. 6, the scanning process 100 continues by adding scan targets (STEP 104). Scan targets are used for a variety of reasons. Some scan targets are used to facilitate identifying key features in a scan. Other scan targets are used to align multiple scans. Some scan software programs can automatically detect certain types of scan targets. The center of these automatically recognized targets by the scan software can be used to take precise measurements. Referring also to FIG. 11, non-limiting examples of scan targets 42 arranged in the cabin 20 and along the cabin floor 22 are provided. As illustrated, the scan targets 42 are configured as checkerboard scan targets with colored arrows (e.g., yellow arrows) that facilitate identifying center points on the checkerboard scan targets.

Figure 12A:
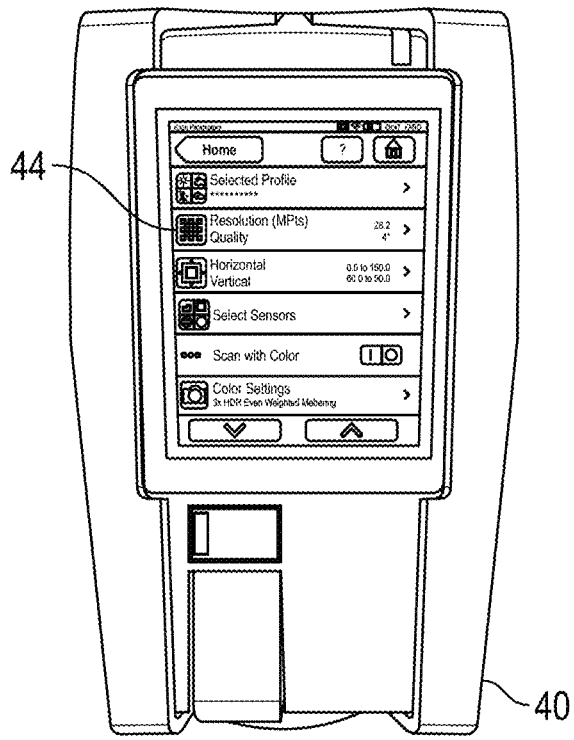
FIGS. 12A-C illustrate various scan setting displays of a 3D scanner in accordance with an exemplary embodiment.
Figure 12B:
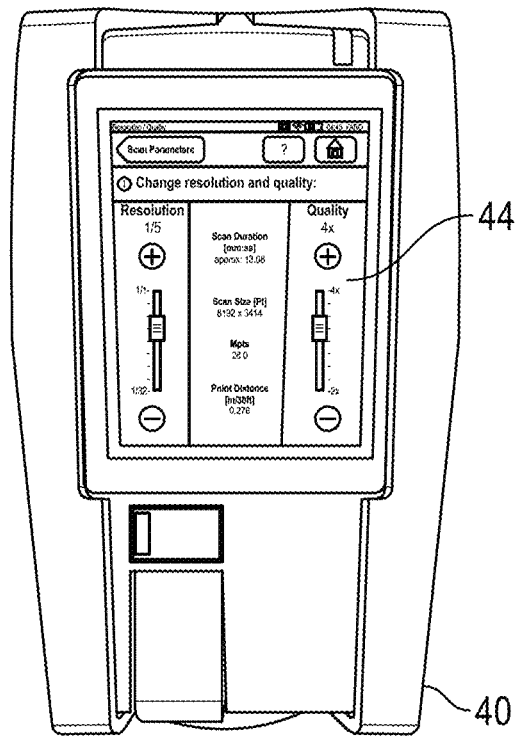
Figure 12C:
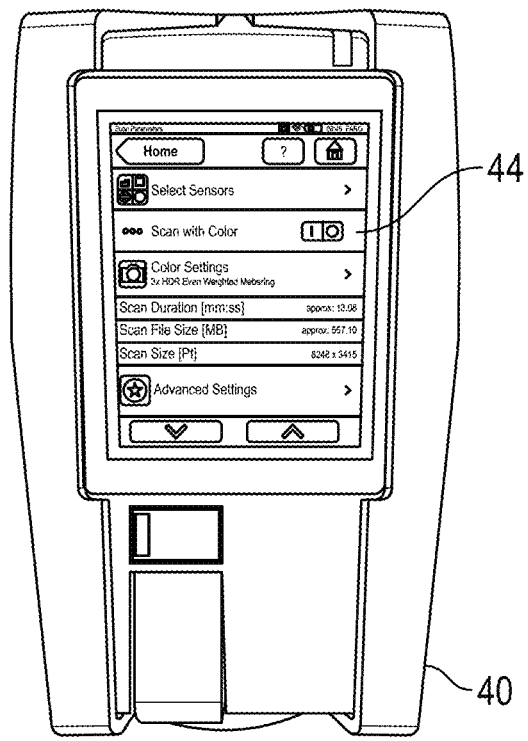

Referring to FIGS. 6 and 12A-12C, the scanning process 100 continues by updating the scanner settings 44 of the one or more 3D scanners 40 and scanning (STEP 106) the interior portion 24 (e.g., cabin including cabin walls, cabin floor, furniture assets, etc.) of the aircraft 10. It is important to select appropriate scanner settings prior to capturing data. While high resolution, high quality settings may capture a large amount of detail, the scan could take several hours to complete. Conversely, low resolution, low quality scans are fast, but the point spacing is large, making it difficult to capture part contours, especially at large distances. In an exemplary embodiment, a very effective setting for scanning aircraft interiors was determined to be one of the pre-defined sets, "Indoor HDR" as shown in FIGS. 12A-C. The "Indoor" designation includes appropriate light, resolution and quality settings for a medium-size room. The "HDR" designation stands for "High-Dynamic-Range", and it includes optimum settings for high definition photographs that closely replicate the range of luminance that is experienced by the human eyes. By using the "Indoor HDR" setting, a complete 360-degree scan takes about 13 min.

During scanning, the one or more 3D scanners 40 generate raw scan data of the interior portion 24 of the aircraft 10. In order to capture the entire cabin 20 with minimal shadowing, it takes between 3 and 5 individual scans, each at a different location in the cabin, for a total of about 1-hr of scan time. The total number of scans depends on the aircraft interior configuration. The 1-hr time frame is practical for both pre-flight ground scans and in-flight scans at steady cruise, and the results provide sufficient resolution to capture the aircraft interior contours.

Referring to FIG. 6, in an exemplary embodiment, after scanning, the scan software processes the raw scan data (STEP 108), transforming the raw scan data into more useable scan data. For example, in the case of the Faro Focus 3D scanner, the scan software combines the scan points with pictures that were taken by the 3D scanner during the scan. The first half of a Faro Focus scan employs a laser that is used for determining the locations of the points (e.g., scan points) it contacts on the surface of the scan subject using a phase shift calculation. After the scan points are determined, the Faro Focus takes pictures of all the area that were scanned. When the data is processed, the scan software assigns color values from the pictures to corresponding scan points.

Figure 13:
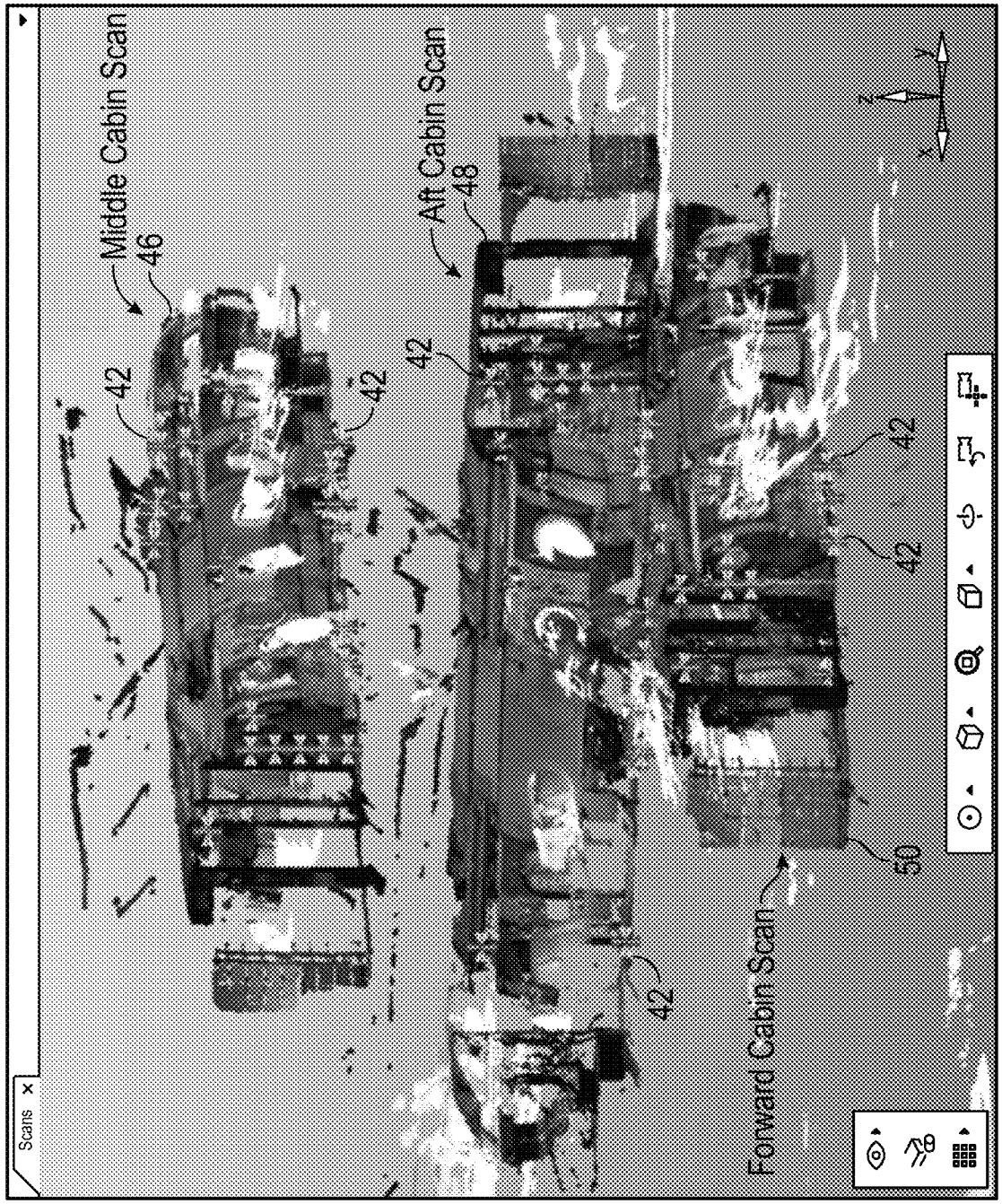
FIG. 13 illustrates combined fuselage scans of forward, middle, and aft cabin sections of an interior portion of an aircraft in accordance with an exemplary embodiment.

FIG. 13 illustrates an example of colored scan point clouds 46, 48, and 50 for each scan that is generated by processing the raw scan data. In this example, there are three different point clouds 46, 48, and 50 that were generated from raw scan data taken from three different scans inside the cabin, specifically the forward, middle, and aft sections of the cabin. The center points of each checkerboard scan target 42 are indicated by colored arrows (e.g., yellow arrows). Each scan or scan point cloud 46, 48, and 50 is aligned to a global coordinate system in accordance with how the 3D scanner was oriented at the start of the corresponding scan. As the 3D scanner was facing different directions when each scan was started, the combined file shows each point cloud 46, 48, and 50 in a different direction. In addition, an altimeter sensor is located inside the Faro Focus 3D scanner. The purpose of this feature is to assign an altitude value to each scan to facilitate aligning the scans (point clouds 46, 48, and 50). The altitude varied slightly between each scan, causing vertical offsets for the point clouds 46, 48, and 50 as shown in FIG. 13.

Figure 14:
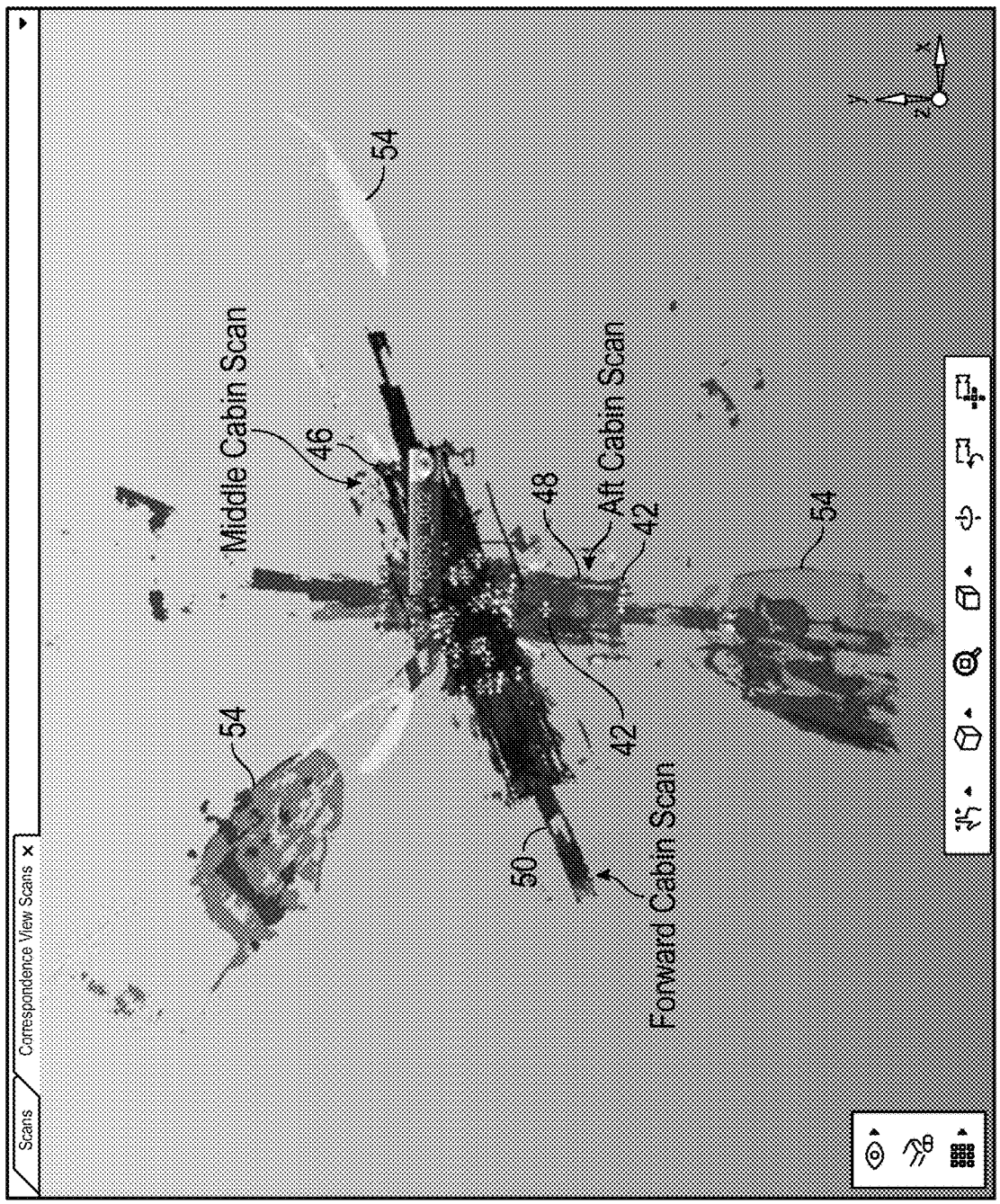
FIG. 14 illustrates a top view of combined fuselage scans in accordance with an exemplary embodiment.
Figure 15:
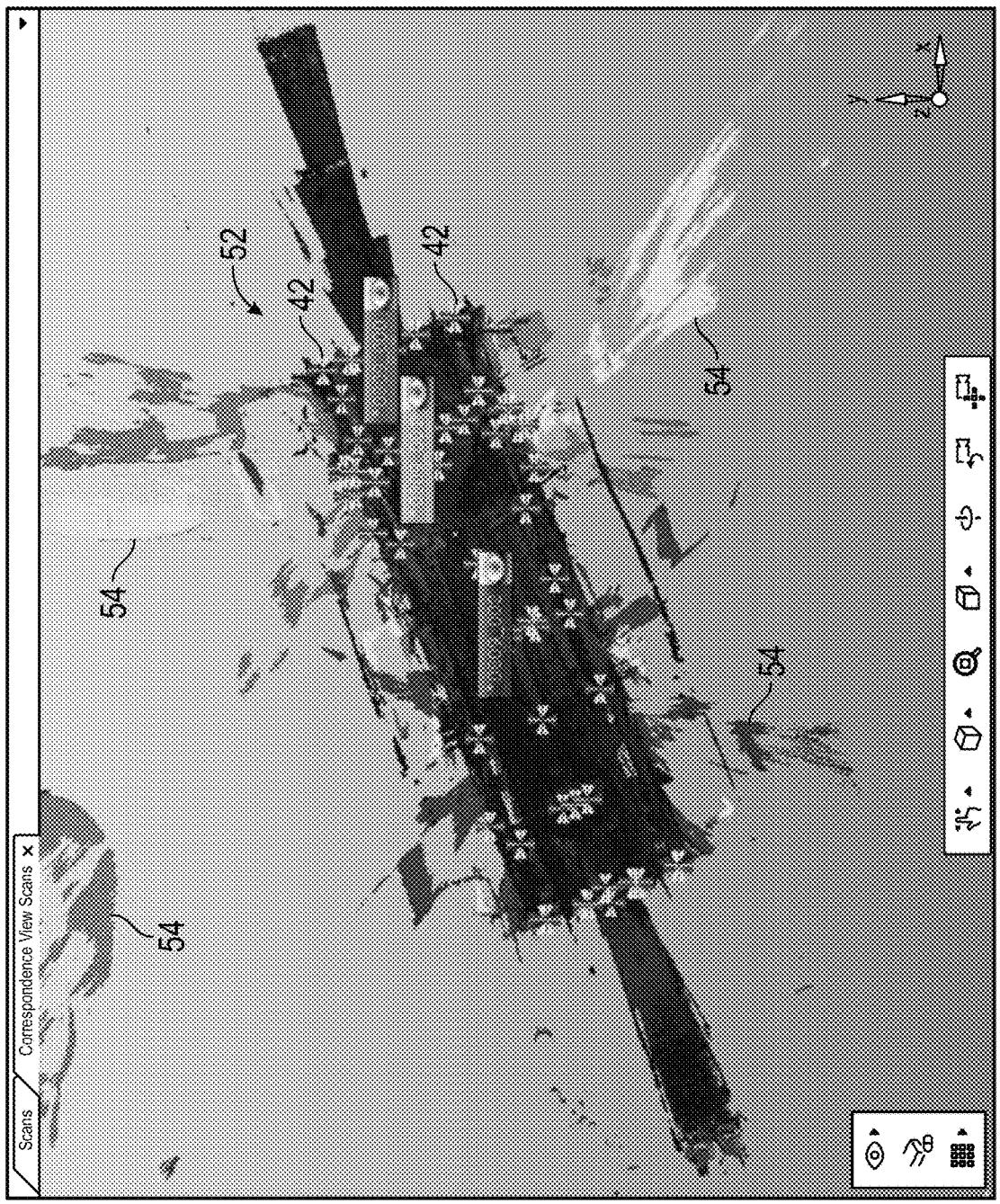
FIG. 15 illustrates a top view of combined fuselage scans after initial alignment in accordance with an exemplary embodiment.

Referring again to FIG. 6, the scanning process 100 continues by registering the multiple scans (STEP 110). In an exemplary embodiment, registration is a process that includes aligning multiple scans (e.g., multiple point clouds) and combining these into a single scan or combined point cloud. Registration uses a combination of scan target points and geometry to align multiple scans of a single scan subject. FIG. 14 illustrates an example of unregistered scans or point clouds 46, 48, and 50 of the interior portion 24 of the aircraft 10 and depicts top views of multiple scans in which each scan or point cloud 46, 48, and 50 is in different colors to simplify identification. FIG. 15 illustrates the scans depicted in FIG. 14 after being registered to form a combined point cloud 52, as indicated by the overlapping colors shown along the length of the fuselage 12. The pattern formed by the scan target points 42 is used for a rough registration. The final registration is completed by using a software feature that creates a "best fit" of the geometry between the scans.

Figure 16:
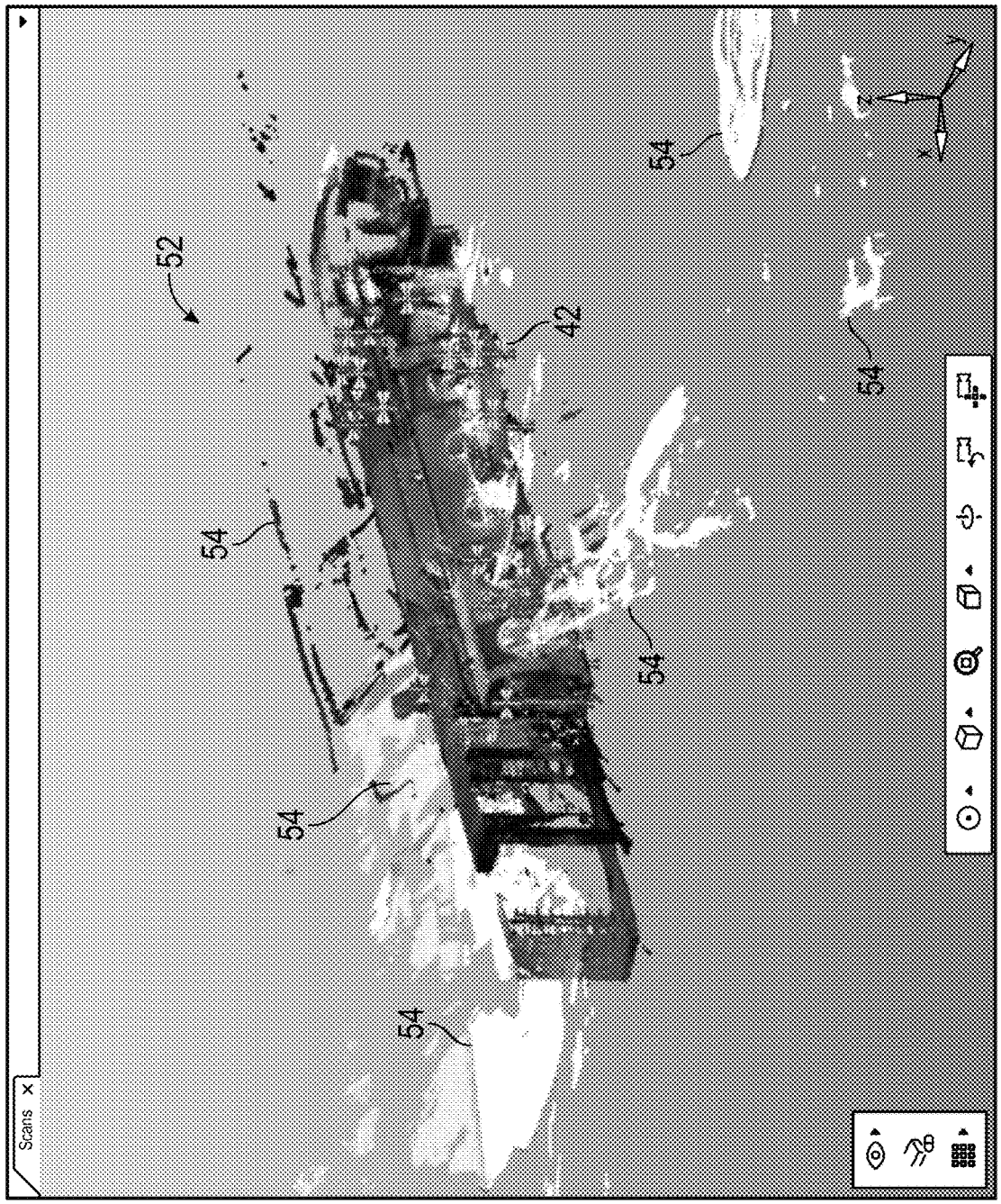
FIG. 16 illustrates a perspective view of combined fuselage scans imported and aligned in accordance with an exemplary embodiment.

The same registered scans or point clouds 46, 48, and 50 from FIG. 15 are also shown in FIG. 16, but the point color information is shown in FIG. 16. As this point cloud 52 is composed of multiple registered scans from various parts of the cabin 20, it is representative of the entire cabin 20. In an exemplary embodiment, a byproduct of the scanning process 100 is noise. The additional stray points and clusters 54 shown in FIGS. 15-16, which are outside the main cabin 20, are noise (e.g., not real or not representative of the surface of the scan subject) and can be cleaned and removed. These additional stay points and clusters 54 can be caused, for example, by windows, mirrors, and other highly reflective surfaces in the cabin that can interfere with laser measuring systems.

Figure 17A:
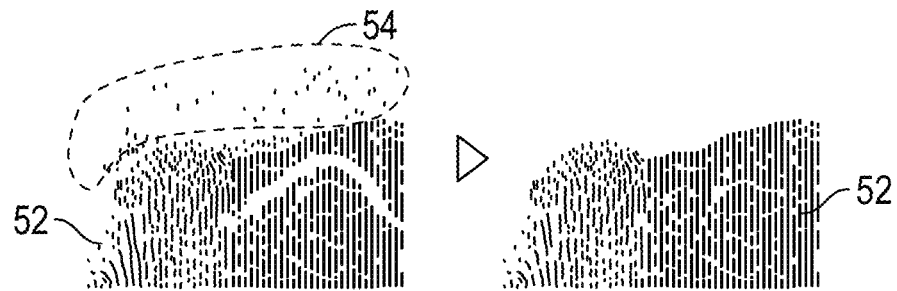
FIG. 17A illustrates a combined point cloud after filtering in accordance with an exemplary embodiment.
Figure 17B:
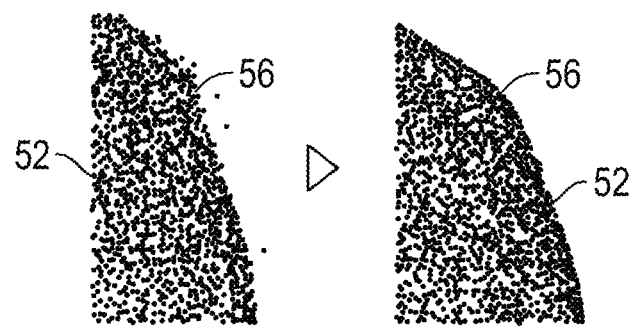
FIG. 17B illustrates a combined point cloud after smoothing in accordance with an exemplary embodiment.
Figure 17C:
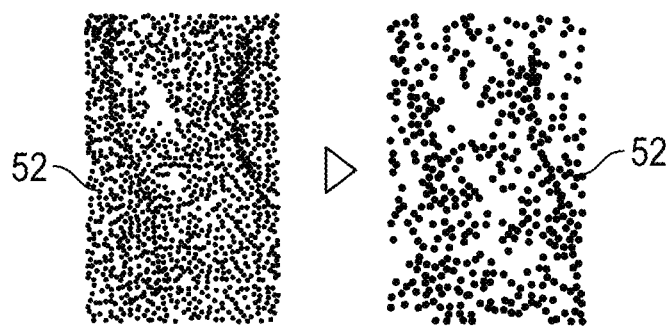
FIG. 17C illustrates a combined point cloud after sampling in accordance with an exemplary embodiment.
Figure 18:
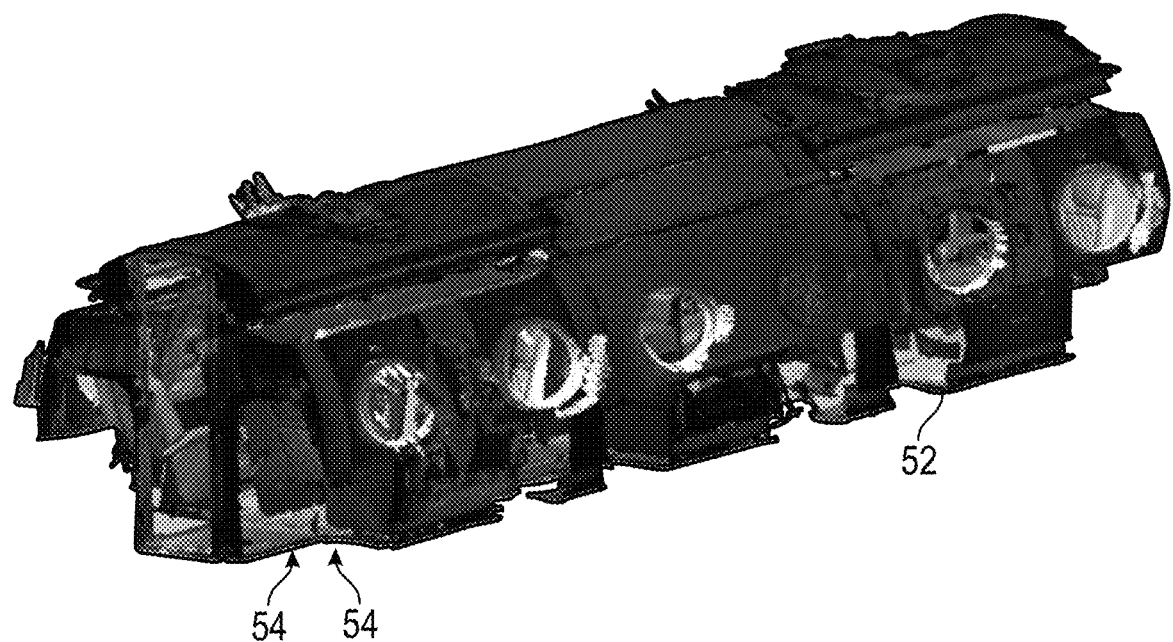
FIG. 18 illustrates a perspective view of combined fuselage scans after noise filtering in accordance with an exemplary embodiment.

Referring again to FIG. 6, the scanning process 100 continues by filtering, smoothing and sampling (STEP 112) the single combined point cloud 52 that was generated by combining and registering multiple scans. In an exemplary embodiment, filtering the single combined point cloud 52 removes unwanted points (e.g., stay points and clusters 54) from outside the scan subject as shown in FIG. 17A. After excess points have been removed, the remaining points of the single combined point cloud 52 are smoothed to reduce the roughness of the outer shape 56 of the scan subject as shown in FIG. 17B. The scan points of the single combined point cloud 52 are then sampled to reduce the total number of points of the scan subject as shown in FIG. 17C. FIG. 18 illustrates the single combined point cloud 52 depicted in FIG. 16 after filtering, smoothing, and sampling. Although some stray points 54 are still shown in FIG. 18, a majority of the erroneous data has been removed. In an exemplary embodiment, once the single combined point cloud 52 has been filtered, smooth, and sampled, the scan data is relatively more usable and shows substantially all surface aspects of the scan subject with substantially most of the noise having been removed.

Figure 19:
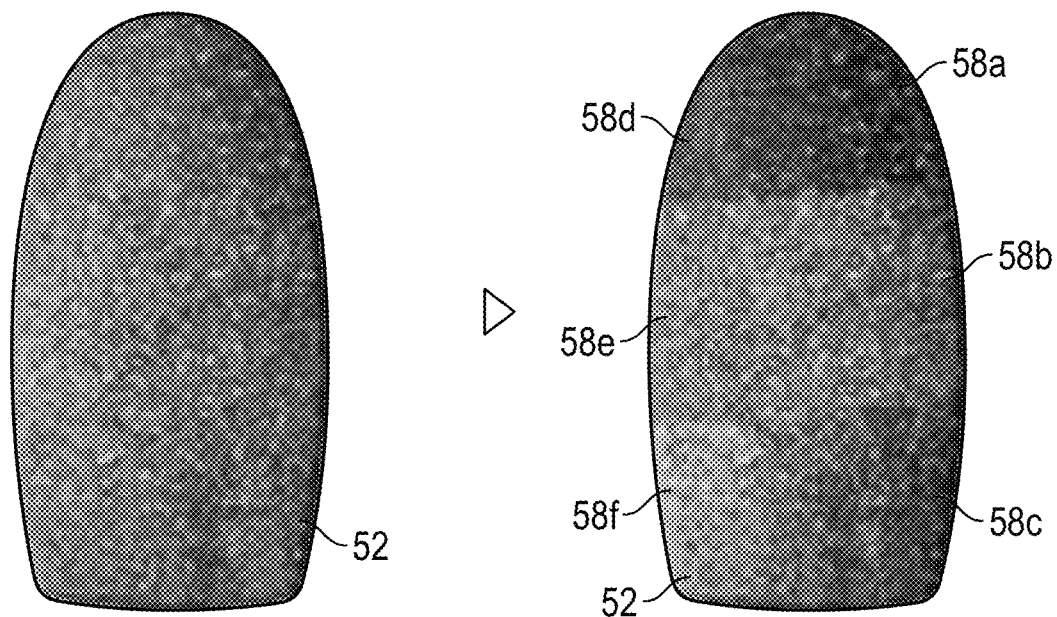
FIG. 19 illustrates segmenting a point cloud into scan regions in accordance with an exemplary embodiment.
Figure 20:
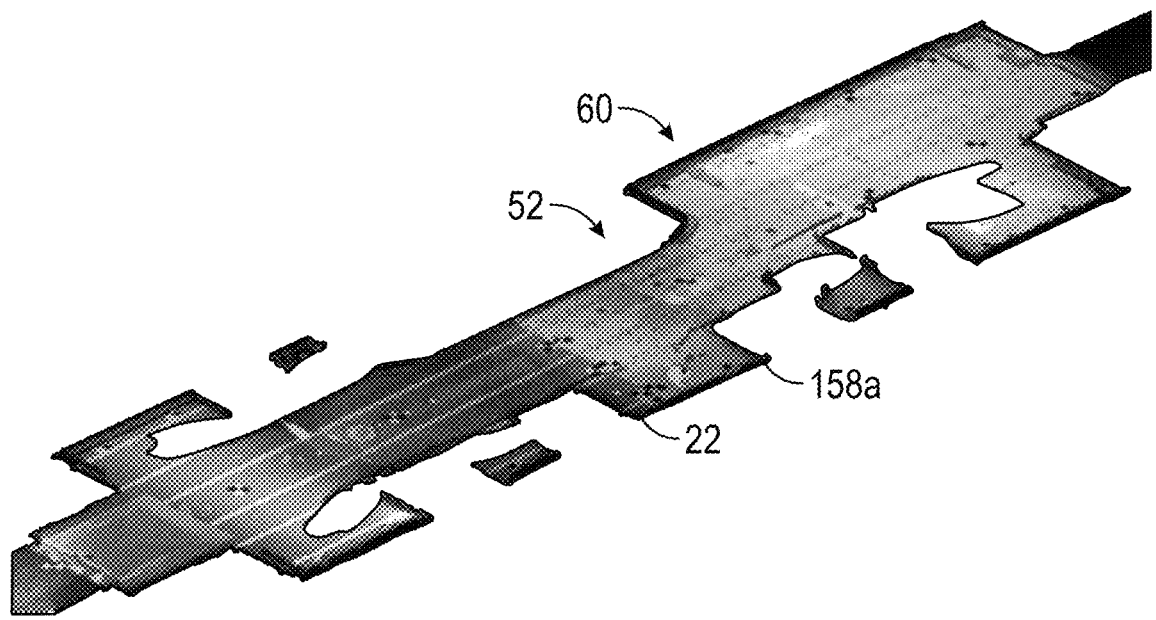
FIG. 20 illustrates a perspective view of combined pre-flight cabin floor scans in accordance with an exemplary embodiment.

After processing, registering, combining, filtering, smoothing, and sampling, the scan data is ready for comparison and analysis. Referring to FIGS. 6 and 19, in an exemplary embodiment, to facilitate using the scan data for comparisons, the scanning process 100 continues by segmenting (STEP 114) the single combined point cloud 52, which has been filtered, smooth, and sampled, into point regions 58*a-f*. The segmentation process segments the scan data into more usable "chunks" or point regions 58*a-f* and allows key features to be isolated and examined more closely, such as, for example, the cabin floor 22 as illustrated in FIG. 20. As will be discussed in further detail below, when comparing scan data, for example, for characterizing shape changes of the cabin floor 22 due to flight loads, it is easier and more practical to compare and analyze the cabin floor scan data with the remainder of the scan data, such as for the cabin furniture 32, fuselage sidewalls 28, and headliner 30, removed.

Figure 22:
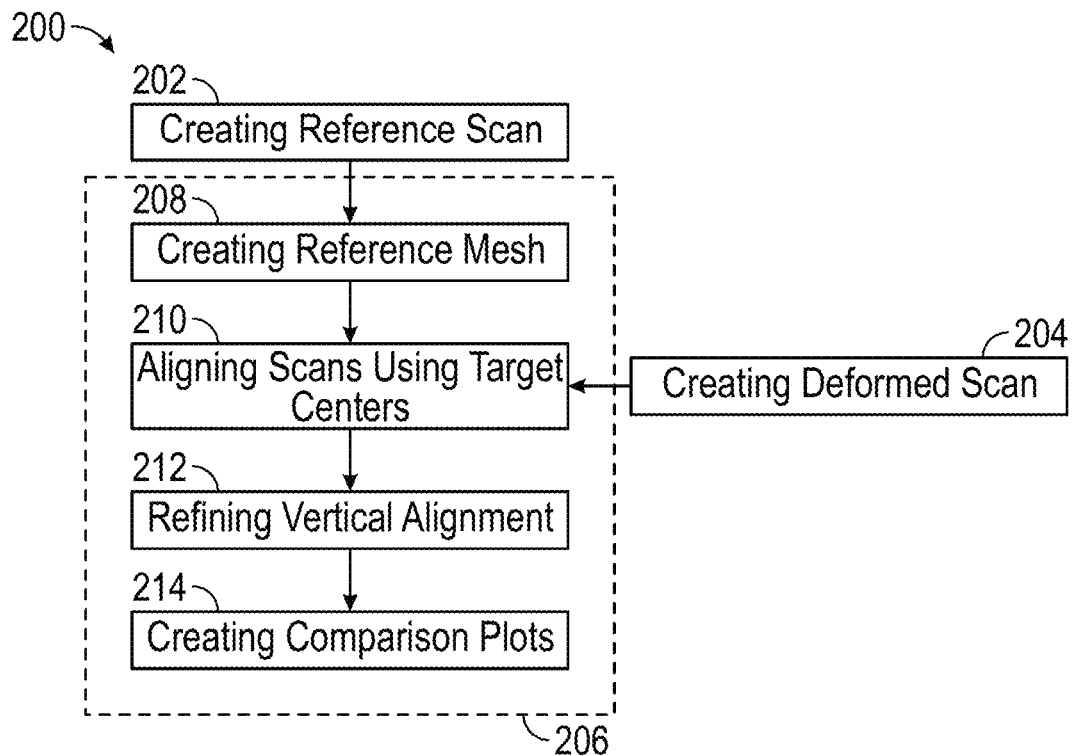
FIG. 22 illustrates a method for characterizing shape changes of an interior portion of an aircraft from flight loads in accordance with an exemplary embodiment.

Referring to FIG. 22, a method 200 for characterizing shape changes of an interior portion of an aircraft from flight loads is provided. In an exemplary embodiment, the method 200 includes creating a reference scan (STEP 202) and, independently, creating a deformed scan (STEP 204) using the scanning process 100 as discussed in the foregoing paragraphs and in relation to FIG. 6. In particular, the reference scan is created by using the scanning process 100 to scan the interior portion 24 of the aircraft 10 with one or more 3D scanners 40 while the aircraft 10 is substantially stationary, such as, for example, on the ground before flight. FIG. 20 illustrates a point region 158*a* of a reference scan 60 showing a cabin floor 22 of an aircraft 10 that was created using the scanning process 100 while the aircraft 10 was on the ground before flight.

Figure 21:
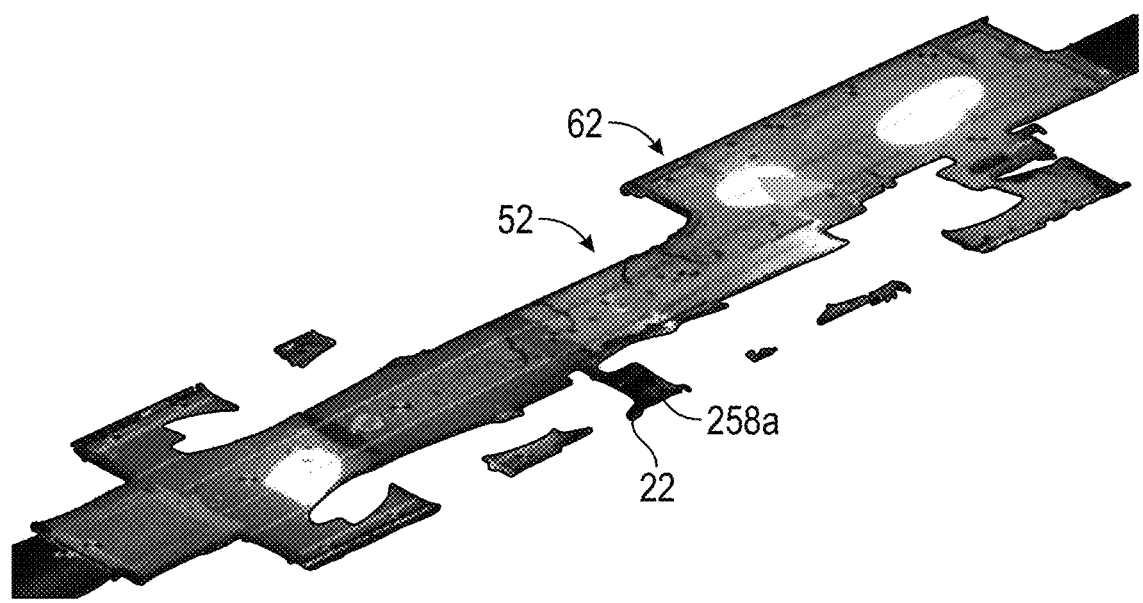
FIG. 21 illustrates a perspective view of combined cabin floor scans taken proximate a maximum operating altitude of an aircraft in accordance with an exemplary embodiment.

Likewise, a deformed scan is created by using the scanning process 100 to scan the interior portion 24 of the aircraft 10 with one or more 3D scanners 40 while the aircraft 10 is in flight subject to substantial flight loads, such as the aircraft 10 being in flight at an altitude proximate to its maximum operating altitude, for example at an altitude of about 51,000 ft. FIG. 21 illustrates a point region 258*a* of a deformed scan 62 showing the cabin floor 22 of the aircraft 10 depicted in FIG. 20 but that was created using the scanning process 100 while the aircraft 10 was flying at an altitude of about 51,000 ft.

In an exemplary embodiment and as will be discussed in further detail below, the method 200 includes postprocessing and analyzing (STEP 206) the reference scan 60 and the deformed scan 62. The reference scan 60 includes not only the point region 158*a* of the cabin floor 22 as illustrated in FIG. 20, but also scan data and corresponding point regions 158 of the interior furnishings 32 installed and adjusted in the interior portion 24 of the aircraft 10 while on the ground. The deformed scan 62 includes similar scan data and corresponding point regions 258 as the reference scan 60 but while the aircraft 10 was in flight. The deformed scan 62 is compared to the reference scan 60 to capture how surfaces of the interior portion 24 of the aircraft 10 move (e.g., magnitude and direction) due to flight loads to characterize the shape changes of the interior portion 24.

Figure 23:
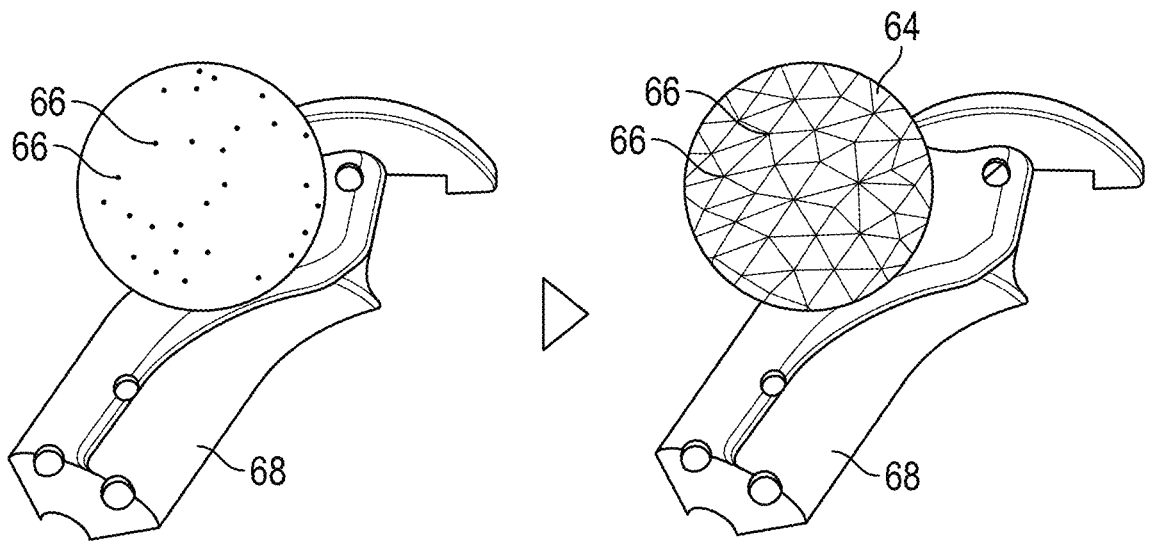
FIG. 23 illustrates a mesh triangulation from scan points in accordance with an exemplary embodiment.

Referring to FIG. 22, in an exemplary embodiment, for postprocessing and analyzing the reference scan 60 and the deformed scan 62, the method 200 continues by creating a reference mesh (STEP 208) from the reference scan 60 by converting reference scan points from the reference scan 60 to a mesh. In one example, the reference mesh 64 is formed of a group of small surfaces that are created by connecting the scan points 66 to form the outer shape of the scan subject 68 such as illustrated in the mesh triangulation shown in FIG. 23. In an exemplary embodiment, the software uses the reference mesh 64 to calculate distances from deformed scan points relative to the reference scan points to characterize magnitude and direction of shape changes.

In an exemplary embodiment, the method 200 continues by aligning (STEP 210) the deformed scan 62 with the reference scan 60 including the reference mesh 64 using scan target centers. In particular, centers of scan targets 42 are used as reference datums for alignment. In the case of cabin scan data, the outermost sections of the cabin floor 22 may be used as a reference. This choice of reference datums is helpful for this analysis because most of the cabin furniture 32 is attached to the outer seat track near the outer edge of the cabin floor 22. Understanding how the cabin floor 22 and the fuselage 12 surfaces move relative to the attachment point(s) is helpful for design. Checkerboard scan targets 42, for example, may be installed on the outer edges of the cabin floor 22 before the reference scan 60 is taken, so the same scan targets 42 may be captured during both the reference scan 60 and the deformed scan 62, e.g., ground and in-flight scans.

Figure 24:
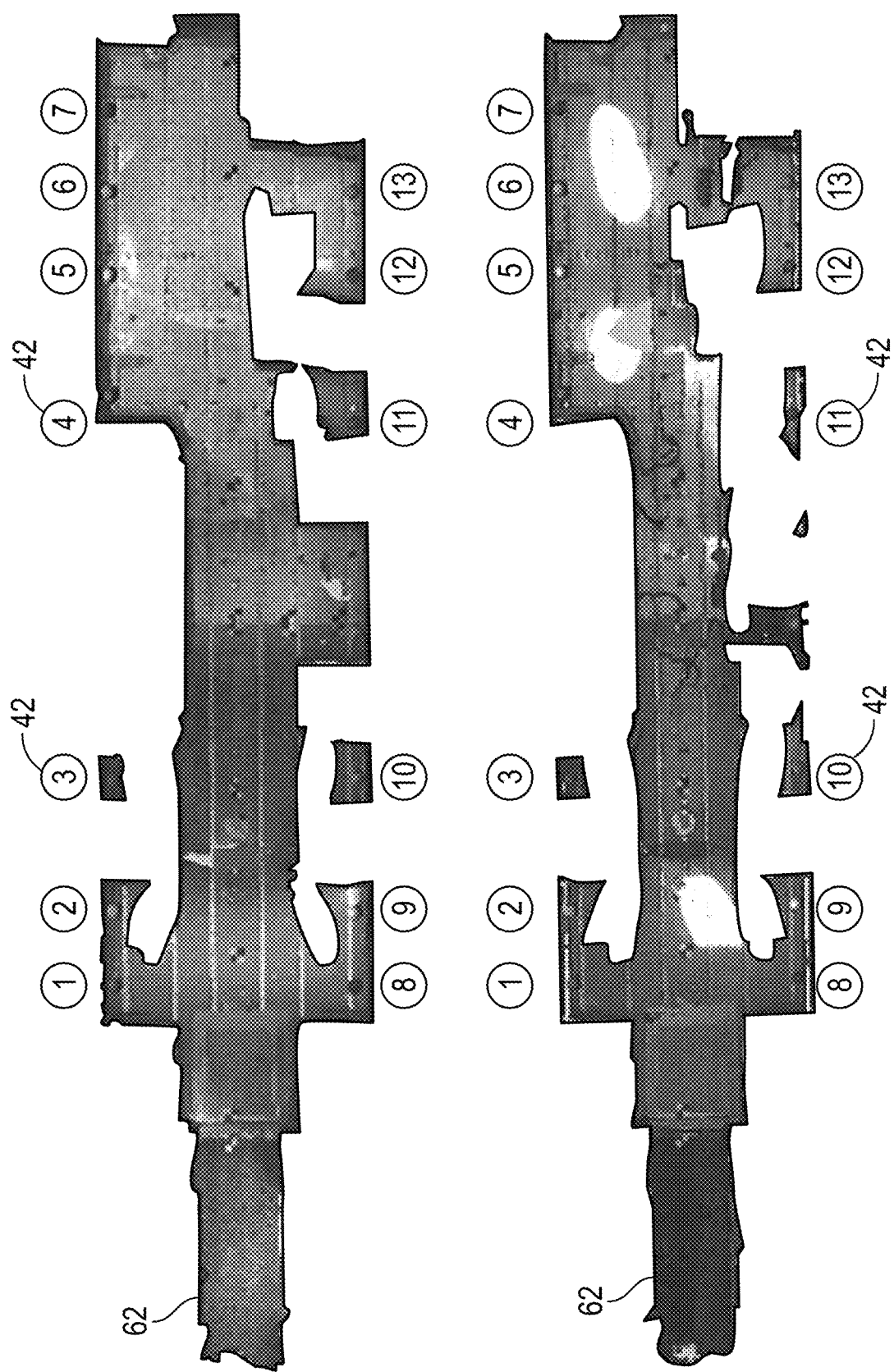
FIG. 24 illustrates scan target center points as datums for alignment of combined pre-flight scans (top) and proximate maximum operating altitude scans (bottom) in accordance with an exemplary embodiment.
Figure 25:
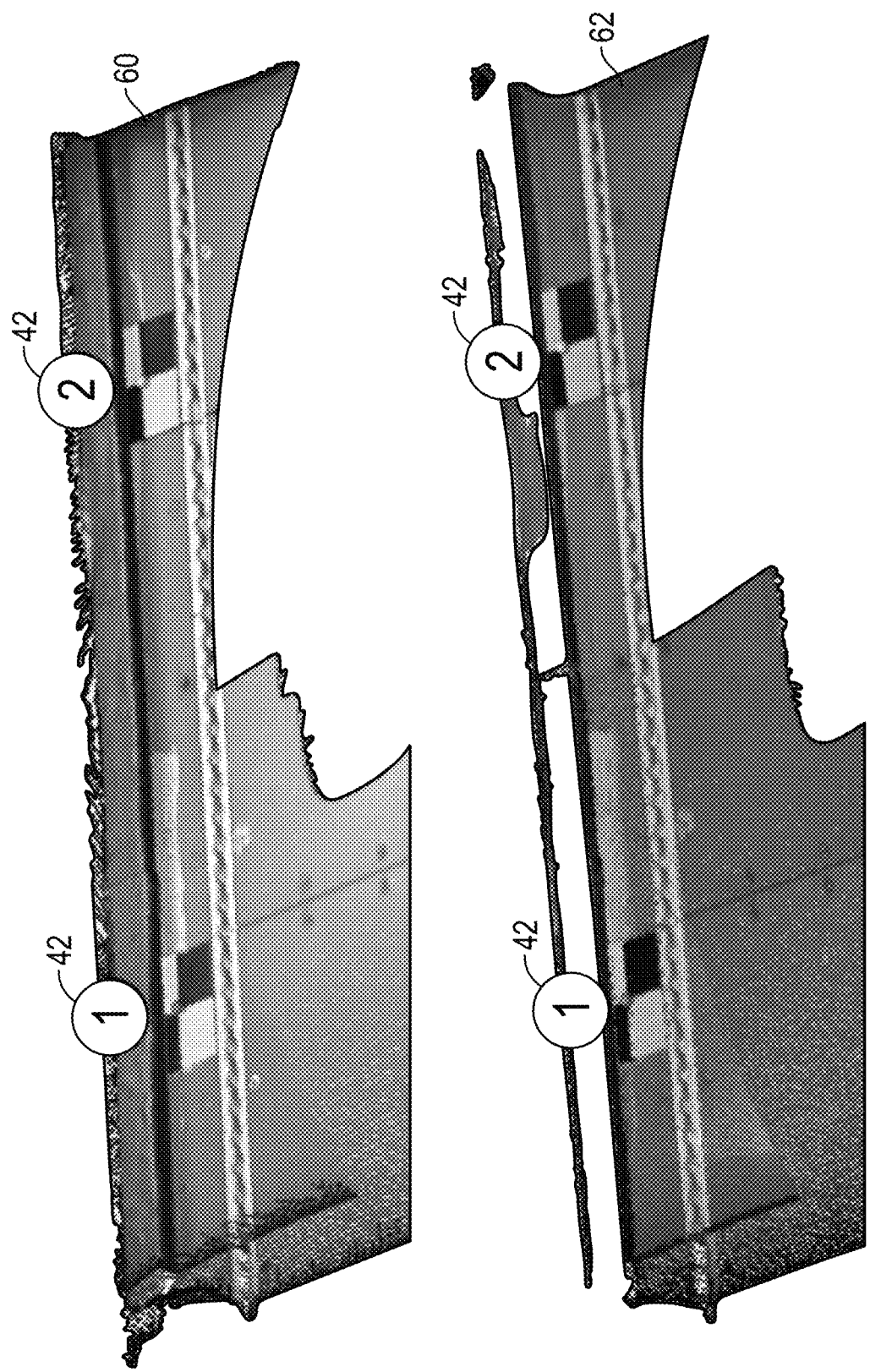
FIG. 25 is an enlarged view of some of the scan target center points depicted in FIG. 24.
Figure 26:
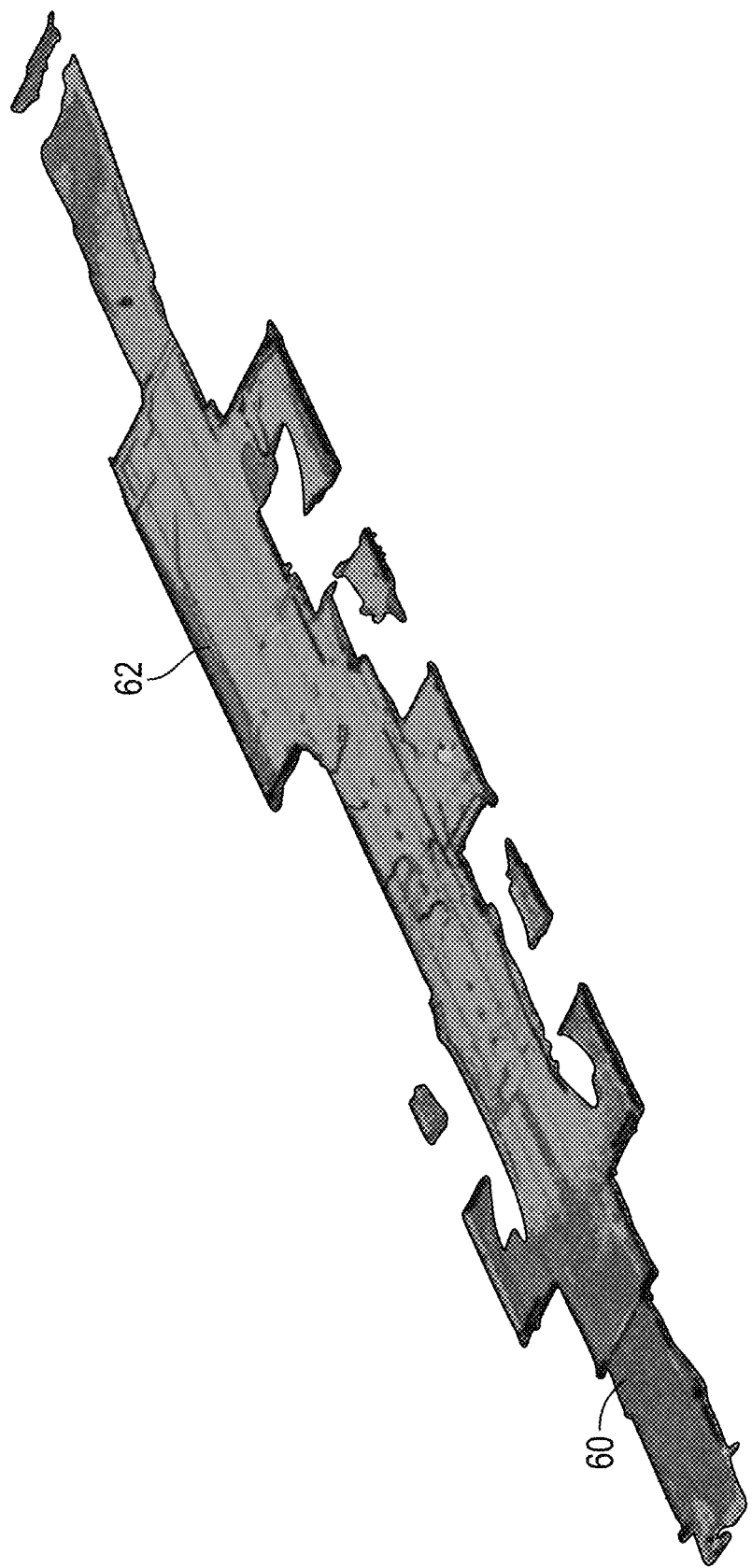
FIG. 26 illustrates a perspective view of aligned scans of a pre-flight scan and a proximate maximum operating altitude scan in accordance with an exemplary embodiment.

FIGS. 24-25 illustrates an example of the scan target 42 points (indicated by the dots numbered 1-13) used for alignment of the reference scan 60 and the deformed scan 62. The center points of the scan targets 42 are used for an initial alignment step. After the corresponding center points are selected on both the reference and deformed scans 60 and 62 as shown in FIGS. 24-25, a best fit alignment may be completed by the software. FIG. 26 illustrates the reference and deformed scans 60 and 62 aligned.

Figure 27:
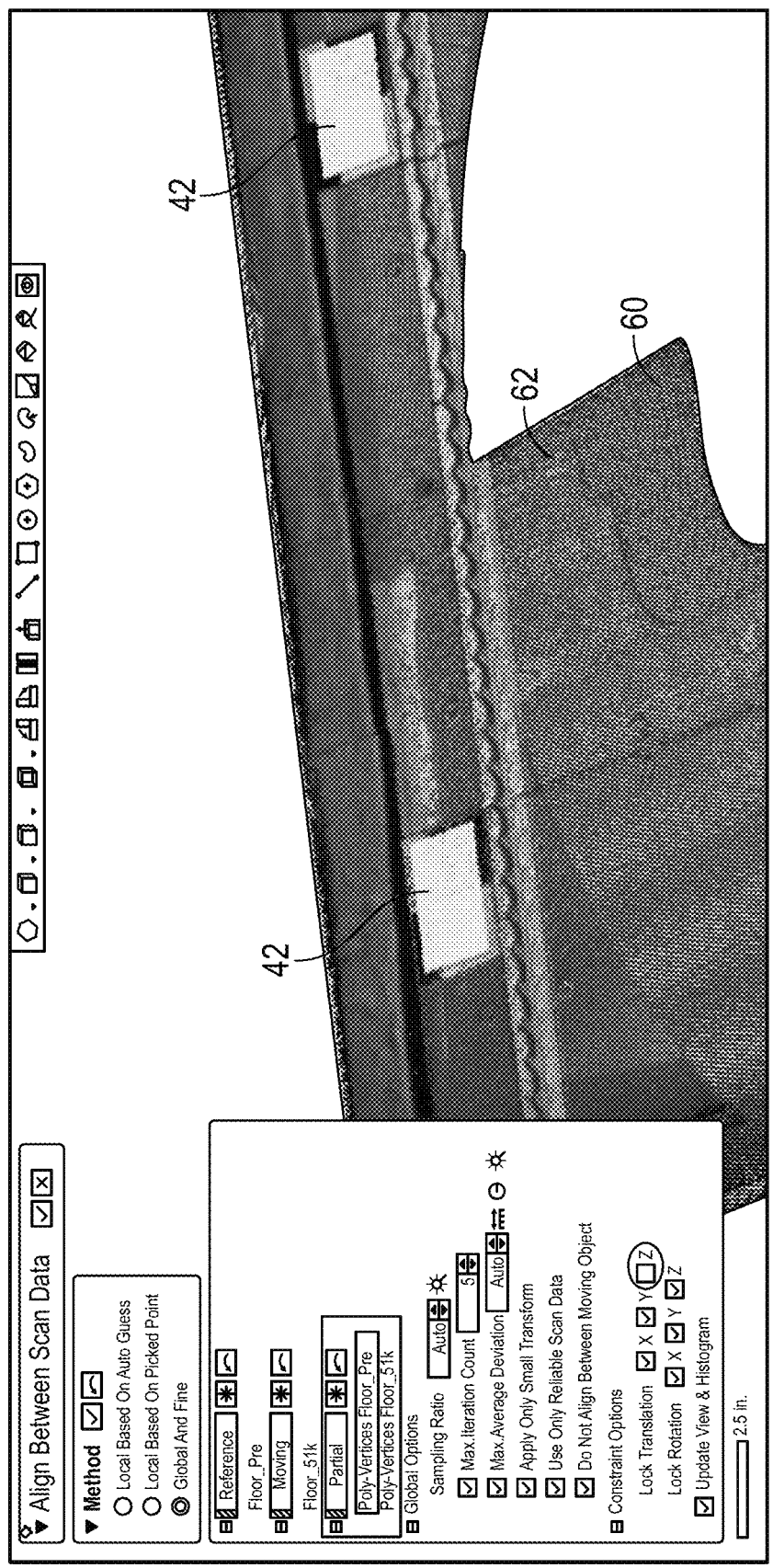
FIG. 27 is an example of using a portion of a scan for vertical alignment.

Referring to FIG. 22, in an exemplary embodiment, the method 200 continues by refining the vertical alignment (STEP 212) of the reference scan 60 and the deformed scan 62. In an exemplary embodiment, after initial alignment of the reference scan 60 and the deformed scan 62, the vertical alignment is refined using select scan targets 42 from both the reference and deformed scans 60 and 62 as shown in FIG. 27, which illustrates an enlarged view with two scan targets 42. In this example for refinement, only translation in the vertical (Z) direction is allowed, while all other translation and rotation directions are fixed or otherwise locked. In an exemplary embodiment, the initial alignment using scan target 42 centers is sufficient for all other or non-vertical directions, but the vertical (Z) refinement provides an improved assurance that the vertical deformation measurements will be accurate. The vertical alignment is particularly important because vertical deformations cause a majority of the problems for aircraft interiors.

Figure 28:
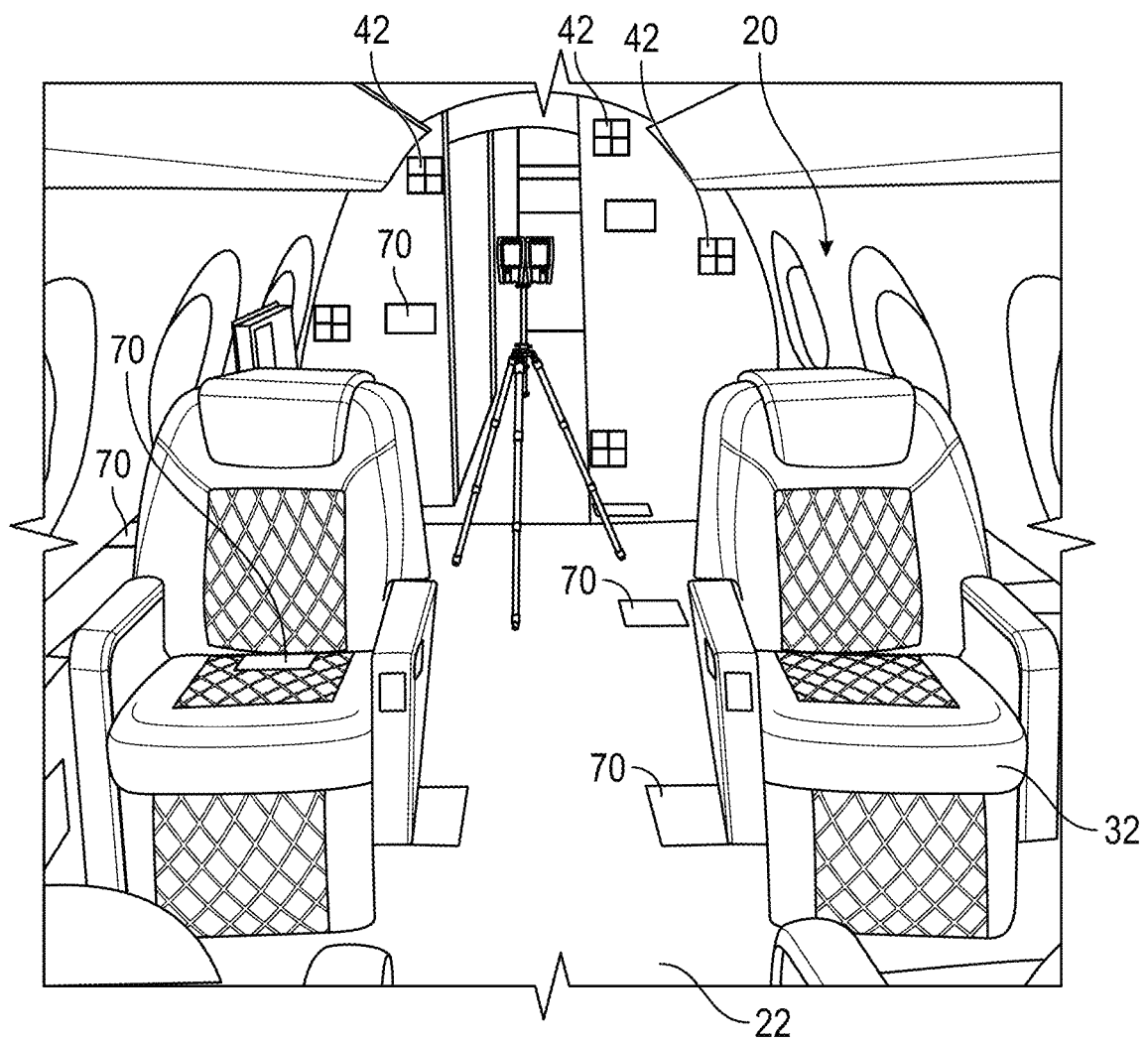
FIG. 28 illustrates a perspective view of a simulated aircraft cabin setup including dimensionally defined scan elements for a validation scan in accordance with an exemplary embodiment.
Figure 29:
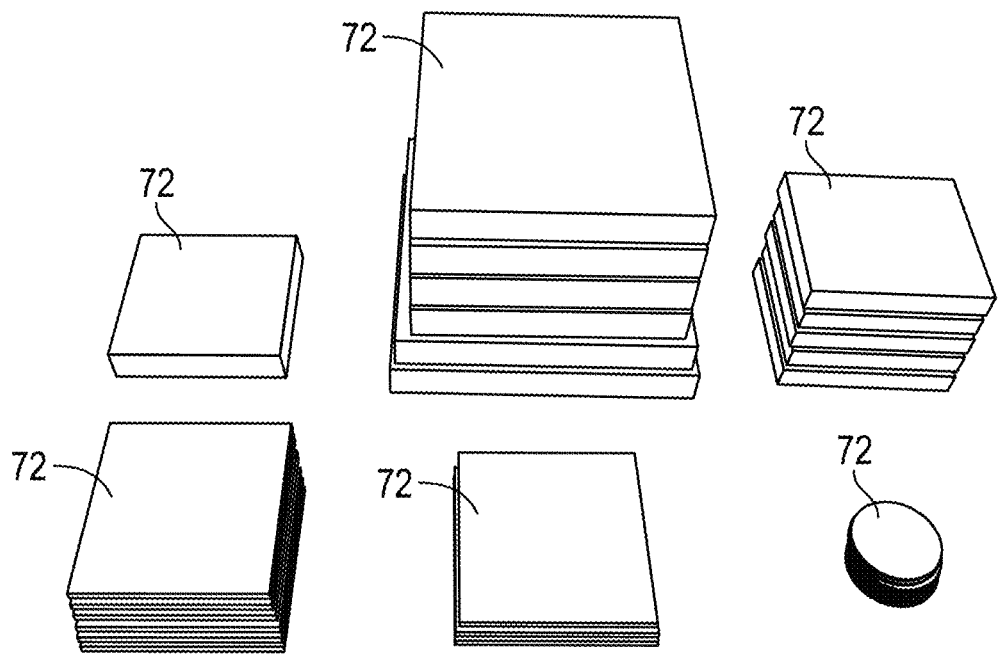
FIG. 29 illustrates a perspective views of dimensionally defined scan elements for a validation scan in accordance with an exemplary embodiment.
Figure 30:
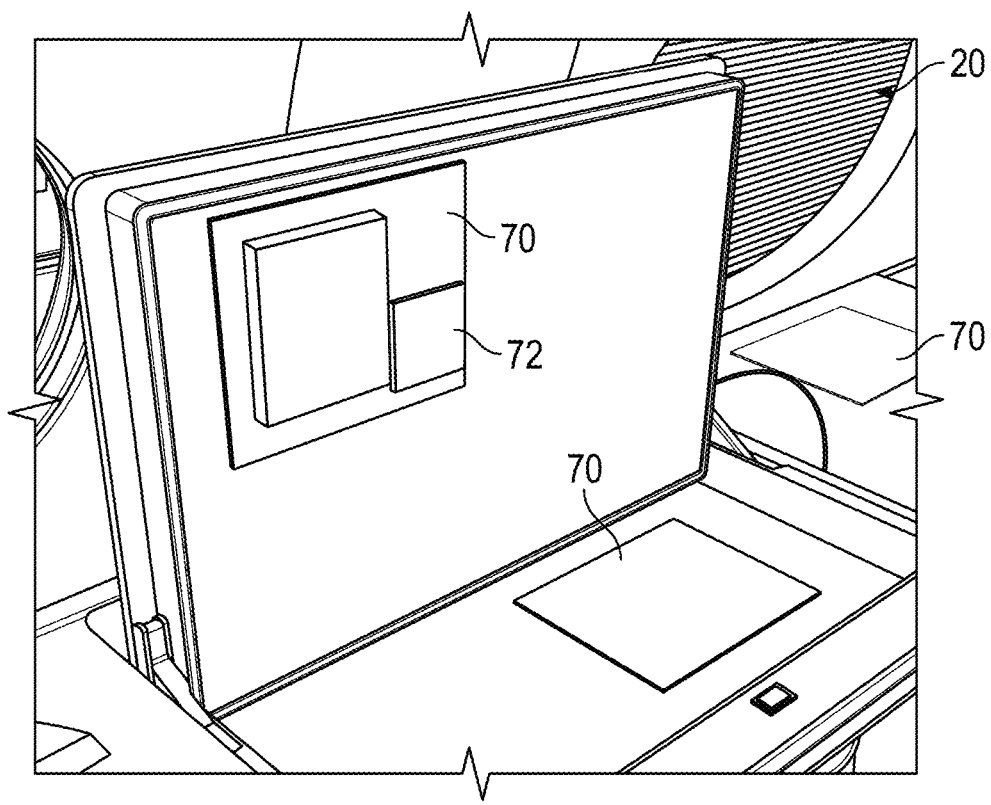
FIG. 30 illustrates a perspective view of vertically oriented dimensionally defined scan elements in a simulated aircraft cabin setup in accordance with an exemplary embodiment.
Figure 31:
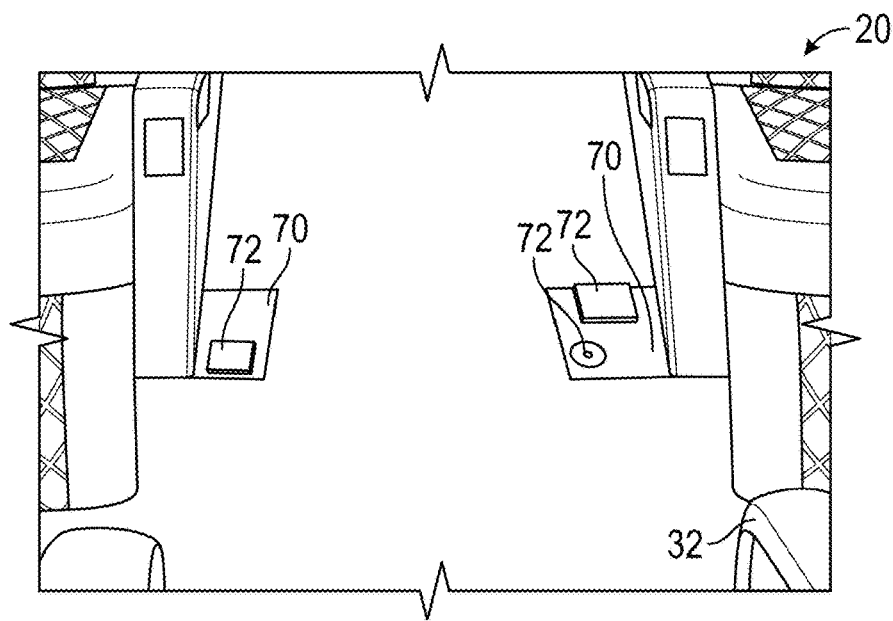
FIG. 31 illustrates a perspective view of horizontally oriented dimensionally defined scan elements positioned along the cabin floor in a simulated aircraft cabin setup in accordance with an exemplary embodiment.

In an exemplary embodiment, optionally a validation scan may be taken using data from a simulated aircraft cabin (e.g., cabin 20 with dimensionally defined scan elements). The validation scan can help statistically demonstrate the effectiveness for characterizing the deformation magnitudes and directions expected during flight. In this embodiment, a baseline simulated cabin scan is compared to an additional scan of the same simulated cabin with pre-measured blocks, discs, and/or any other dimensionally defined scan elements to represent the deformed areas. An example of a simulated aircraft cabin 20 is shown in FIG. 28 with checkerboard scan targets 42 and flat cardstock sheets 70 in strategic locations. The flat white cards or sheets 70 provide clean baseline scan areas at the locations where simulated deformation blocks, discs, or other dimensionally defined scan elements can be added for a "deformed" scan. The added dimensionally defined scan elements 72 (e.g., blocks and discs) are shown added to the flat cardstock 70 in FIGS. 29-31.

Figure 32:
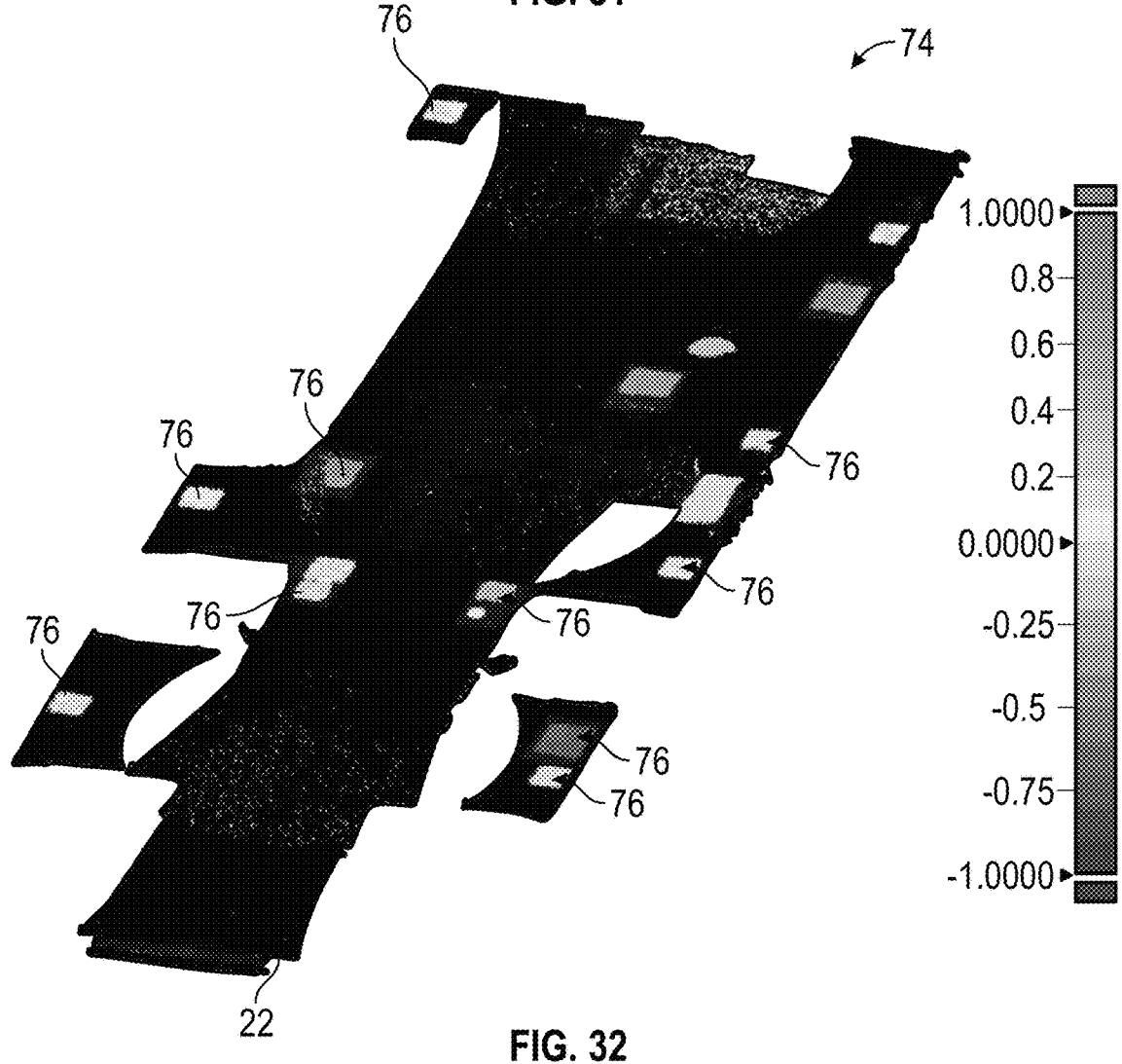
FIG. 32 is a contour plot of the cabin floor including the horizontally oriented dimensionally defined scan elements depicted in FIG. 31 in accordance with an exemplary embodiment.
Figure 33:
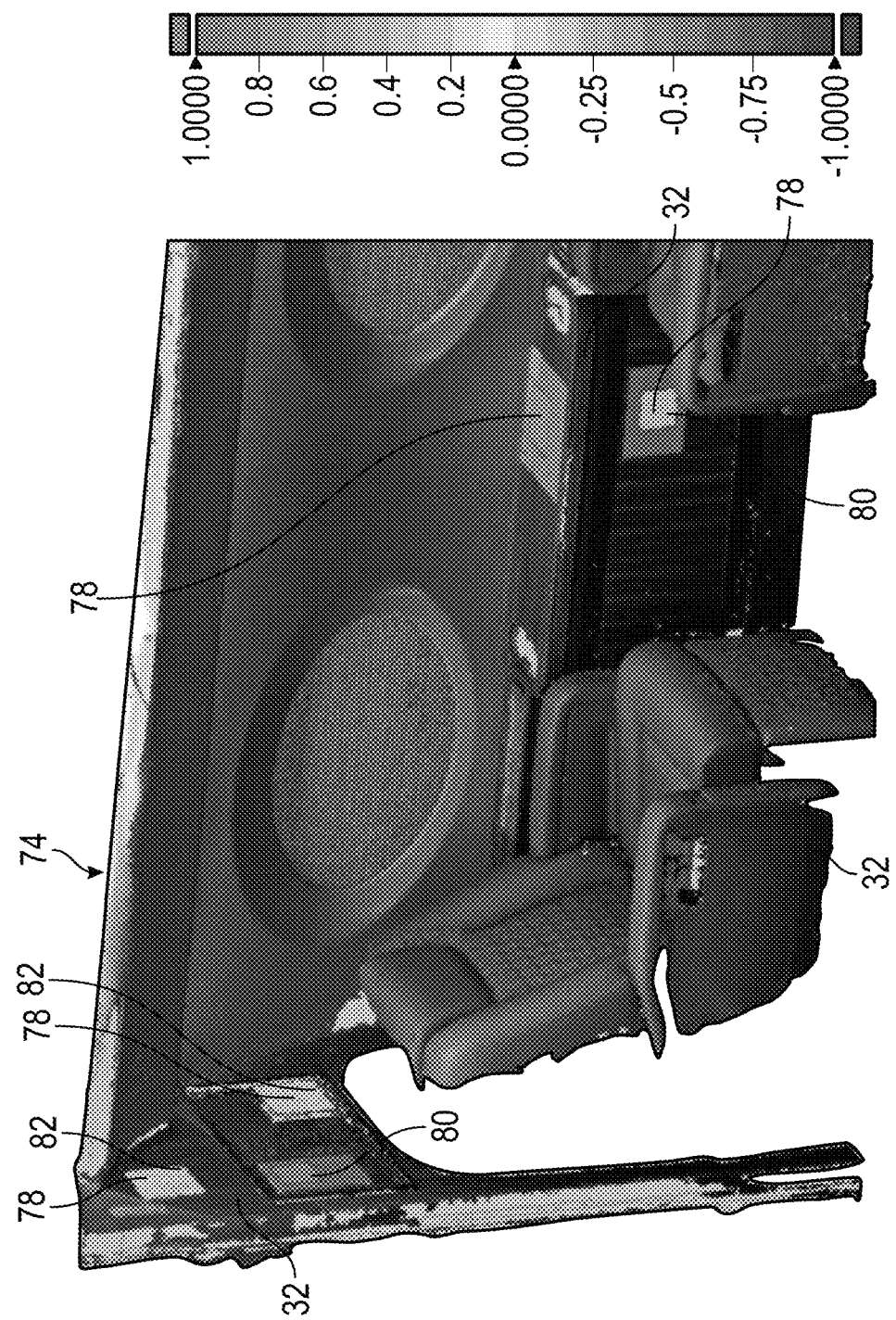
FIG. 33 is a contour plot of a portion of the simulated aircraft cabin setup including the vertically oriented dimensionally defined scan elements depicted in FIG. 30 in accordance with an exemplary embodiment.

Referring again to FIG. 22, the method 200 continues by creating comparison plots (STEP 214), such as contour plots, whisker plots, or a combination of contour and whisker plots. A contour plot as used herein is understood to mean a plot that displays 3-D information on a 2-D surface, for example, similar to how a contour map shows hills and valleys over terrain. A whisker plot as used herein is understood to mean a plot that uses colored lines that extend outward from a nominal surface, varying in length according to the deviation they represent. A contour plot 74 of the cabin floor 22 created by Geomagic Control X software is shown in FIG. 32, with each floor target deviation 76 shown. In an exemplary embodiment, each target deviation 76 (e.g., colored square) is isolated and the statistics for each of these areas are captured for later analysis (results provided below in Table 1). FIG. 33 illustrates a contour plot 74 showing target deviations 78 on cabin furniture 32. In the example illustrated, the orange blocks 80 are approximately 0.750 inch, while the yellow targets 82 are flat (about 0.000 inches).

Figure 34:
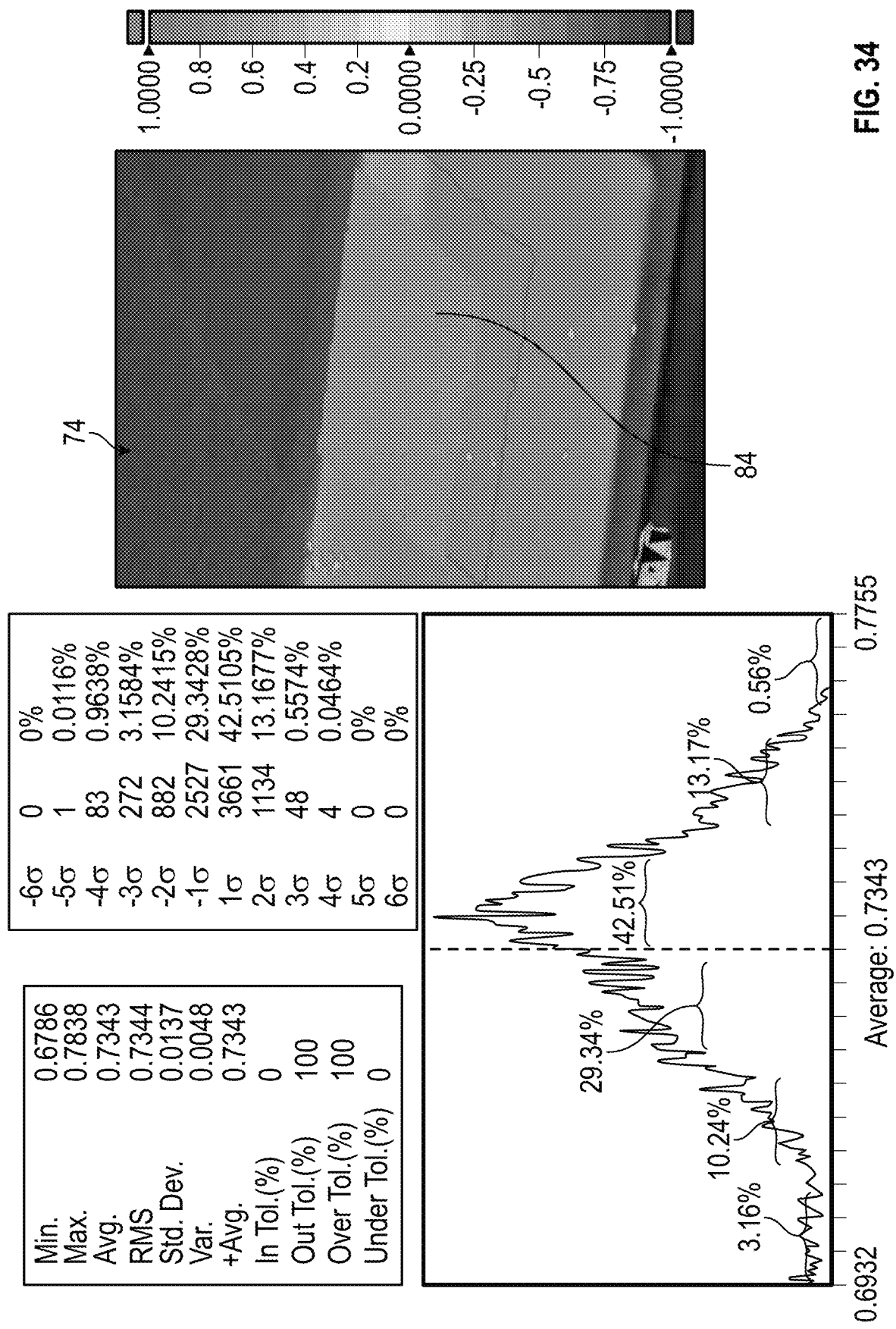
FIG. 34 is an enlarged view of a horizontally oriented dimensionally defined scan element from the contour plot depicted in FIG. 33 including statistical data for a scan measurement.

A close-up of a single scan target contour plot 74 is shown in FIG. 34. Also shown is the statistical information for the group of about 8,350 scan points that represent the target block 84. As shown in the statistical data, the average deviation of the points in this target is about 0.7343 inches. The measured thickness for this scan target is about 0.7375 inches, which means the measurement deviation is 0.7343 inches-0.7375 inches=−0.0032 inches for this target. A histogram of the data points from this target is also shown in FIG. 34, showing +/−3 Standard Deviation ranges.

Figure 35:
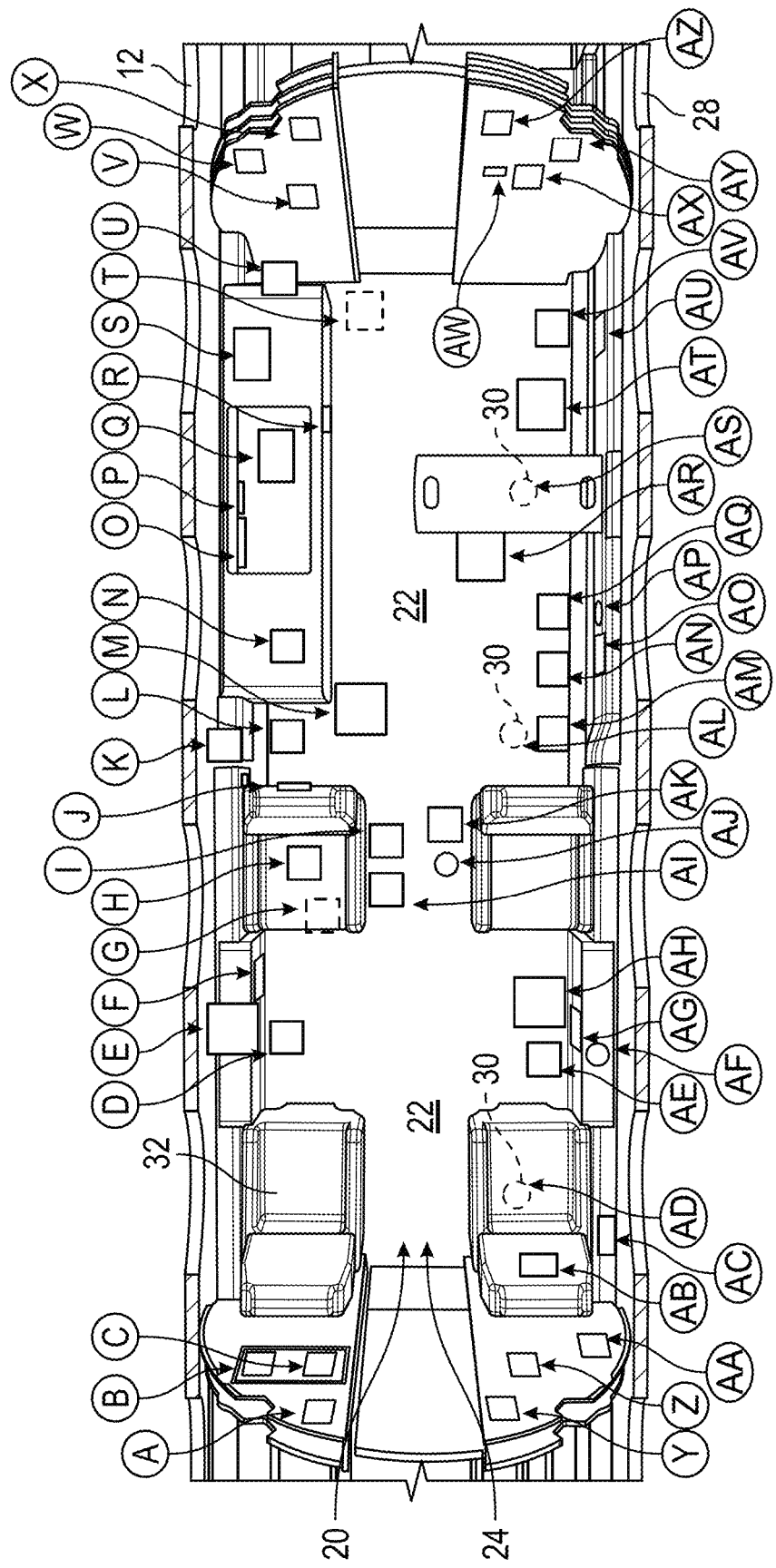
FIG. 35 is a top view of evaluation target locations for within an interior portion of a fuselage in accordance with an exemplary embodiment.

A key for all the simulation features (e.g., scan targets) A-AZ to be evaluated for "deformation" is shown in FIG. 35. The scan targets A-AZ added to the interior portion 24 of the cabin 20 range in thickness from about 0.000 inch to about 0.760 inches. The about 0.000 inches scan targets are unaltered flat sheets that were scanned to evaluate scan repeatability. Ideally, the deviation for an unaltered blank sheet should be zero. Each color block represents a different nominal thickness, and all of the scan targets are uniquely identified, starting with A and ending with AZ. The scan targets with dashed outline are on the cabin ceiling 30 (G, T, AD, AL, and AS).

Statistical data is shown below for each scan target in Table 1. Each scan target is represented by thousands of individual scan points. The "Nominal Size" is the approximate size of the block, and each "Nominal Size" group is assigned a unique color to aid in identifying any correlation between block size and resulting measurement deviation. The "Measured Height" is the measured thickness of each block, including the about 0.003 inches tape that was used to secure the block to the blank surface. The statistics (Min, Max, Avg, RMS, STD Dev, and Var) generated using the Geomagic Control X software are for the points that represent each block or scan target. The "Measurement Deviation" is particularly useful or important data, as this data represents the error for a particular measurement feature. The "Standard Deviation of Measurement Deviations" is the standard deviation for each nominal group of measurements. This data indicates that the thicker features tend to have greater standard deviation. For example, the about 0.740 inches, about 0.500 inches, and about 0.250 inches thickness scan targets have standard deviations of about 0.030 inches, while the standard deviations for the about 0.220 inches, about 0.074 inches, and about 0.000 inches thickness scan targets are from about 0.005 inches to about 0.017 inches.

Scan Target Measurement Data

| Meas No. | Target ID | Description | Orientation | Nominal Size (in) | Measured Height (in) | Statistics from Geomagic Control X (in) | | | | | | Measurement Deviation (Avg - Meas) (in) | Std Dev of Meas Deviations (in) |
|---|---|---|---|---|---|---|---|---|---|---|---|---|---|
| | | | | | | Min | Max | Avg | RMS | Std Dev (Target Pts) | Var | | |
| 1 | AX | Bulkhead Wood Block | Vertical | 0.760 | 0.7660 | 0.7708 | 0.8158 | 0.7973 | 0.7973 | 0.0080 | 0.0016 | 0.0313 | 0.0150 |
| 2 | E | Ledge Wood Block | Horizontal | 0.740 | 0.7375 | 0.6786 | 0.7838 | 0.7343 | 0.7344 | 0.0137 | 0.0048 | −0.0032 | 0.0305 |

-continued

Scan Target Measurement Data

| Meas No. | Target ID | Description | Orientation | Nominal Size (in) | Measured Height (in) | Statistics from Geomagic Control X (in) | | | | | | Measurement Deviation (Avg - Meas) (in) | Std Dev of Meas Deviations (in) |
| --- | --- | --- | --- | --- | --- | --- | --- | --- | --- | --- | --- | --- | --- |
| | | | | | | Min | Max | Avg | RMS | Std Dev (Target Pts) | Var | | |
| 3 | AH | Floor Wood Block | Horizontal | 0.740 | 0.7390 | 0.6723 | 0.7657 | 0.7186 | 0.7189 | 0.0201 | 0.0103 | −0.0204 | |
| 4 | M | Floor Wood Block | Horizontal | 0.740 | 0.7390 | 0.6442 | 0.7607 | 0.7092 | 0.7095 | 0.0213 | 0.0115 | −0.0298 | |
| 5 | AR | Floor Wood Block | Horizontal | 0.740 | 0.7380 | 0.6547 | 0.7253 | 0.6863 | 0.6864 | 0.0100 | 0.0026 | −0.0517 | |
| 6 | O | Monitor Wood Block | Vertical | 0.740 | 0.7390 | 0.7368 | 0.8162 | 0.7758 | 0.7759 | 0.0133 | 0.0045 | 0.0368 | |
| 7 | AT | Floor Wood Block | Horizontal | 0.740 | 0.7385 | 0.5830 | 0.7794 | 0.7080 | 0.7081 | 0.0159 | 0.0064 | −0.0305 | |
| 8 | C | Wood Block | Horizontal | 0.500 | 0.5130 | 0.4844 | 0.5429 | 0.5148 | 0.5149 | 0.0085 | 0.0018 | 0.0018 | 0.0319 |
| 9 | G | Wood Block | Horizontal | 0.500 | 0.5270 | 0.4834 | 0.5461 | 0.5208 | 0.5209 | 0.0092 | 0.0021 | −0.0062 | |
| 10 | AK | Wood Block | Horizontal | 0.500 | 0.5140 | 0.4138 | 0.4956 | 0.4505 | 0.4508 | 0.0170 | 0.0074 | −0.0635 | |
| 11 | K | Wood Block | Horizontal | 0.500 | 0.5155 | 0.4897 | 0.5688 | 0.5380 | 0.5381 | 0.0128 | 0.0042 | 0.0225 | |
| 12 | AO | Wood Block | Vertical | 0.500 | 0.5130 | 0.4792 | 0.5111 | 0.4982 | 0.4982 | 0.0050 | 0.0006 | −0.0148 | |
| 13 | Z | Wood Block | Vertical | 0.250 | 0.2495 | 0.1982 | 0.2482 | 0.2265 | 0.2266 | 0.0081 | 0.0017 | −0.0230 | 0.0307 |
| 14 | AG | Wood Block | Vertical | 0.250 | 0.2495 | 0.2681 | 0.3052 | 0.2837 | 0.2838 | 0.0067 | 0.0011 | 0.0342 | |
| 15 | F | Wood Block | Vertical | 0.250 | 0.2495 | 0.2345 | 0.2731 | 0.2540 | 0.2541 | 0.0060 | 0.0009 | 0.0045 | |
| 16 | N | Wood Block | Horizontal | 0.250 | 0.2500 | 0.2120 | 0.2733 | 0.2490 | 0.2492 | 0.0110 | 0.0031 | −0.0010 | |
| 17 | P | Wood Block | Vertical | 0.250 | 0.2490 | 0.2522 | 0.3010 | 0.2778 | 0.2780 | 0.0093 | 0.0022 | 0.0288 | |
| 18 | AU | Wood Block | Vertical | 0.250 | 0.2500 | 0.1406 | 0.2209 | 0.2035 | 0.2036 | 0.0050 | 0.0006 | −0.0465 | |
| 19 | AI | Wood Block | Horizontal | 0.220 | 0.2250 | 0.1185 | 0.2463 | 0.2054 | 0.2062 | 0.0181 | 0.0083 | −0.0196 | 0.0176 |
| 20 | T | Wood Block | Horizontal | 0.220 | 0.2280 | 0.1984 | 0.2600 | 0.2329 | 0.2330 | 0.0083 | 0.0017 | 0.0049 | |
| 21 | V | Wood Block | Vertical | 0.220 | 0.2260 | 0.2114 | 0.2651 | 0.2405 | 0.2407 | 0.0079 | 0.0016 | 0.0145 | |
| 22 | AD | Washer | Horizontal | 0.074 | 0.0765 | 0.0635 | 0.0871 | 0.0736 | 0.0737 | 0.0036 | 0.0003 | −0.0029 | 0.0118 |
| 23 | AF | Washer | Horizontal | 0.074 | 0.0770 | 0.0499 | 0.0985 | 0.0812 | 0.0820 | 0.0113 | 0.0032 | 0.0042 | |
| 24 | AJ | Washer | Horizontal | 0.074 | 0.0770 | 0.0599 | 0.0853 | 0.0722 | 0.0723 | 0.0049 | 0.0006 | −0.0048 | |
| 25 | AL | Washer | Horizontal | 0.074 | 0.0770 | 0.0371 | 0.0919 | 0.0679 | 0.0684 | 0.0087 | 0.0019 | −0.0091 | |
| 26 | AP | Washer | Vertical | 0.074 | 0.0770 | 0.0305 | 0.0649 | 0.0507 | 0.0509 | 0.0044 | 0.0005 | −0.0263 | |
| 27 | AS | Washer | Horizontal | 0.074 | 0.0770 | 0.0613 | 0.1064 | 0.0827 | 0.0831 | 0.0081 | 0.0017 | 0.0057 | |
| 28 | R | Washer | Vertical | 0.074 | 0.0805 | −0.1156 | 0.2064 | 0.0849 | 0.0935 | 0.0391 | 0.0389 | 0.0044 | |
| 29 | AW | Washer | Vertical | 0.074 | 0.0780 | 0.0708 | 0.1082 | 0.0896 | 0.0899 | 0.0075 | 0.0014 | 0.0116 | |
| 30 | A | Fwd BH Checkerboard | Vertical | 0.000 | 0.0000 | −0.0657 | 0.0991 | 0.0088 | 0.0147 | 0.0118 | 0.0035 | 0.0088 | 0.0123 |
| 31 | Y | Fwd BH Checkerboard | Vertical | 0.000 | 0.0000 | −0.0618 | 0.0265 | −0.0206 | 0.0229 | 0.0100 | 0.0025 | −0.0206 | |
| 32 | B | Fwd BH Checkerboard | Vertical | 0.000 | 0.0000 | −0.0771 | 0.1008 | 0.0193 | 0.0218 | 0.0102 | 0.0026 | 0.0193 | |
| 33 | AA | Fwd BH Checkerboard | Vertical | 0.000 | 0.0000 | −0.0686 | 0.0436 | −0.0217 | 0.0247 | 0.0117 | 0.0035 | −0.0217 | |
| 34 | AE | Floor Checkerboard | Horizontal | 0.000 | 0.0000 | −0.0479 | 0.0430 | −0.0050 | 0.0105 | 0.0092 | 0.0021 | −0.0050 | |
| 35 | D | Floor Checkerboard | Horizontal | 0.000 | 0.0000 | −0.0469 | 0.0348 | −0.0040 | 0.0108 | 0.0100 | 0.0025 | −0.0040 | |
| 36 | L | Floor Checkerboard | Horizontal | 0.000 | 0.0000 | −0.0371 | 0.0585 | 0.0090 | 0.0145 | 0.0114 | 0.0033 | 0.0090 | |
| 37 | AM | Floor Checkerboard | Horizontal | 0.000 | 0.0000 | −0.0524 | 0.0503 | 0.0005 | 0.0096 | 0.0096 | 0.0023 | 0.005 | |
| 38 | AQ | Floor Checkerboard | Horizontal | 0.000 | 0.0000 | −0.0755 | 0.0502 | −0.0094 | 0.0124 | 0.0080 | 0.0016 | −0.0094 | |
| 39 | AV | Floor Checkerboard | Horizontal | 0.000 | 0.0000 | −0.0422 | 0.0625 | −0.0012 | 0.0090 | 0.0089 | 0.0020 | −0.0012 | |
| 40 | U | Floor Checkerboard | Horizontal | 0.000 | 0.0000 | −0.0436 | 0.0550 | 0.0005 | 0.0108 | 0.0108 | 0.0030 | 0.0005 | |
| 41 | AY | Aft BH Checkerboard | Vertical | 0.000 | 0.0000 | −0.0226 | 0.0495 | 0.0130 | 0.0177 | 0.0121 | 0.0037 | 0.0130 | |
| 42 | W | Aft BH Checkerboard | Vertical | 0.000 | 0.0000 | −0.0890 | 0.0849 | −0.0142 | 0.0210 | 0.01SS | 0.0061 | −0.0142 | |
| 43 | AZ | Aft BH Checkerboard | Vertical | 0.000 | 0.0000 | −0.0468 | 0.0397 | −0.0015 | 0.0127 | 0.0126 | 0.0040 | −0.0015 | |
| 44 | X | Aft BH Checkerboard | Vertical | 0.000 | 0.0000 | −0.0649 | 0.0297 | −0.0179 | 0.0211 | 0.0111 | 0.0031 | −0.0179 | |
| 45 | H | Seat Bottom Flat Sheet | Horizontal | 0.000 | 0.0000 | −0.0055 | 0.0227 | 0.0079 | 0.0086 | 0.0035 | 0.0003 | 0.0079 | 0.0053 |
| 46 | 1 | Floor Flat Sheet | Horizontal | 0.000 | 0.0000 | −0.0713 | 0.0391 | −0.0014 | 0.0160 | 0.0160 | 0.0065 | −0.0014 | |

Scan Target Measurement Data

| Meas No. | Target ID | Description | Orientation | Nominal Size (in) | Measured Height (in) | Statistics from Geomagic Control X (in) | | | | Std Dev (Target Pts) | Var | Measurement Deviation (Avg - Meas) (in) | Std Dev of Meas Deviations (in) |
|---|---|---|---|---|---|---|---|---|---|---|---|---|---|
| | | | | | | Min | Max | Avg | RMS | | | | |
| 47 | J | Flat Sheet Seat Back | Vertical | 0.000 | 0.0000 | −0.0211 | 0.0275 | −0.0039 | 0.0101 | 0.0093 | 0.0022 | −0.0039 | |
| 48 | AN | Floor Flat Sheet | Horizontal | 0.000 | 0.0000 | −0.0813 | 0.0838 | −0.0073 | 0.0095 | 0.0061 | 0.0009 | −0.0073 | |
| 49 | Q | Flat Below Monitor | Horizontal | 0.000 | 0.0000 | −0.0219 | 0.0117 | −0.0003 | 0.0042 | 0.0042 | 0.0004 | −0.0003 | |
| 50 | S | Flat Back Credenza | Horizontal | 0.000 | 0.0000 | −0.0513 | 0.0654 | 0.0026 | 0.0090 | 0.0086 | 0.0019 | 0.0026 | |
| 51 | AB | Flat Seat Back | Horizontal | 0.000 | 0.0000 | −0.0406 | 0.0175 | −0.0081 | 0.0108 | 0.0071 | 0.0013 | −0.0081 | |
| 52 | AC | Flat Ledge Top | Horizontal | 0.000 | 0.0000 | −0.1036 | 0.0817 | −0.0031 | 0.0151 | 0.0148 | 0.0056 | −0.0031 | |

Figure 36:
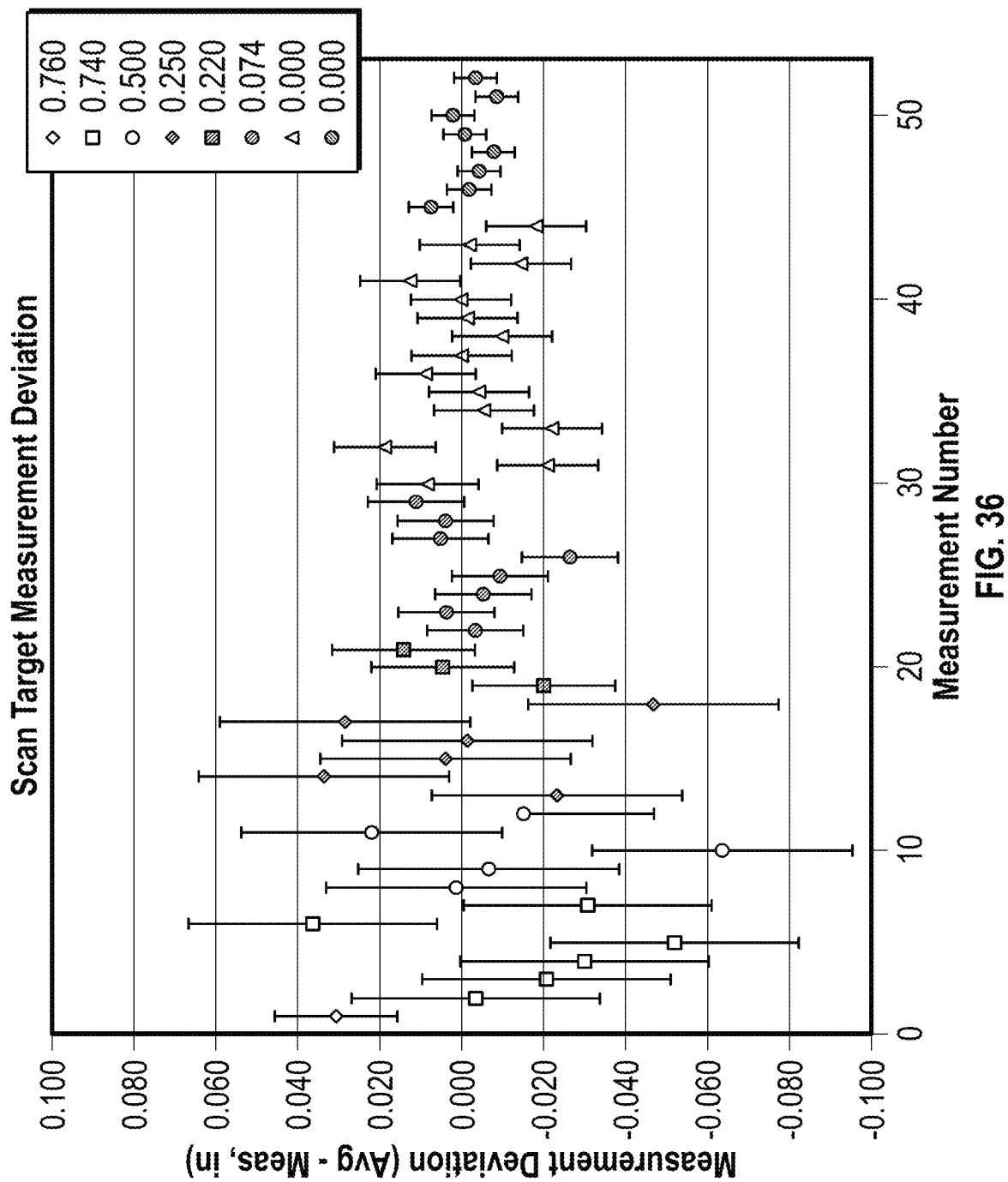
FIG. 36 is a plot of "Measurement Deviation" values for scan targets in accordance with an exemplary embodiment.

FIG. 36 is a plot of the "Measurement Deviation" values for each scan target from Table 1. The marker colors in the plot correspond to each nominal thickness group from Table 1. Vertical error bars are included to represent the Standard Deviation for the corresponding nominal group of targets. As illustrated, the thicker measurement scan targets appear to have a larger measurement deviation compared to the thinner or zero thickness measurement scan targets. In an exemplary embodiment, the measurement data in Table 1 and from FIG. 36 demonstrates that the method 200 which includes the scanning process 100 can be used to detect aircraft fuselage deformations for characterizing shape changes of the interior portion of an aircraft from flight loads.

Figure 37:
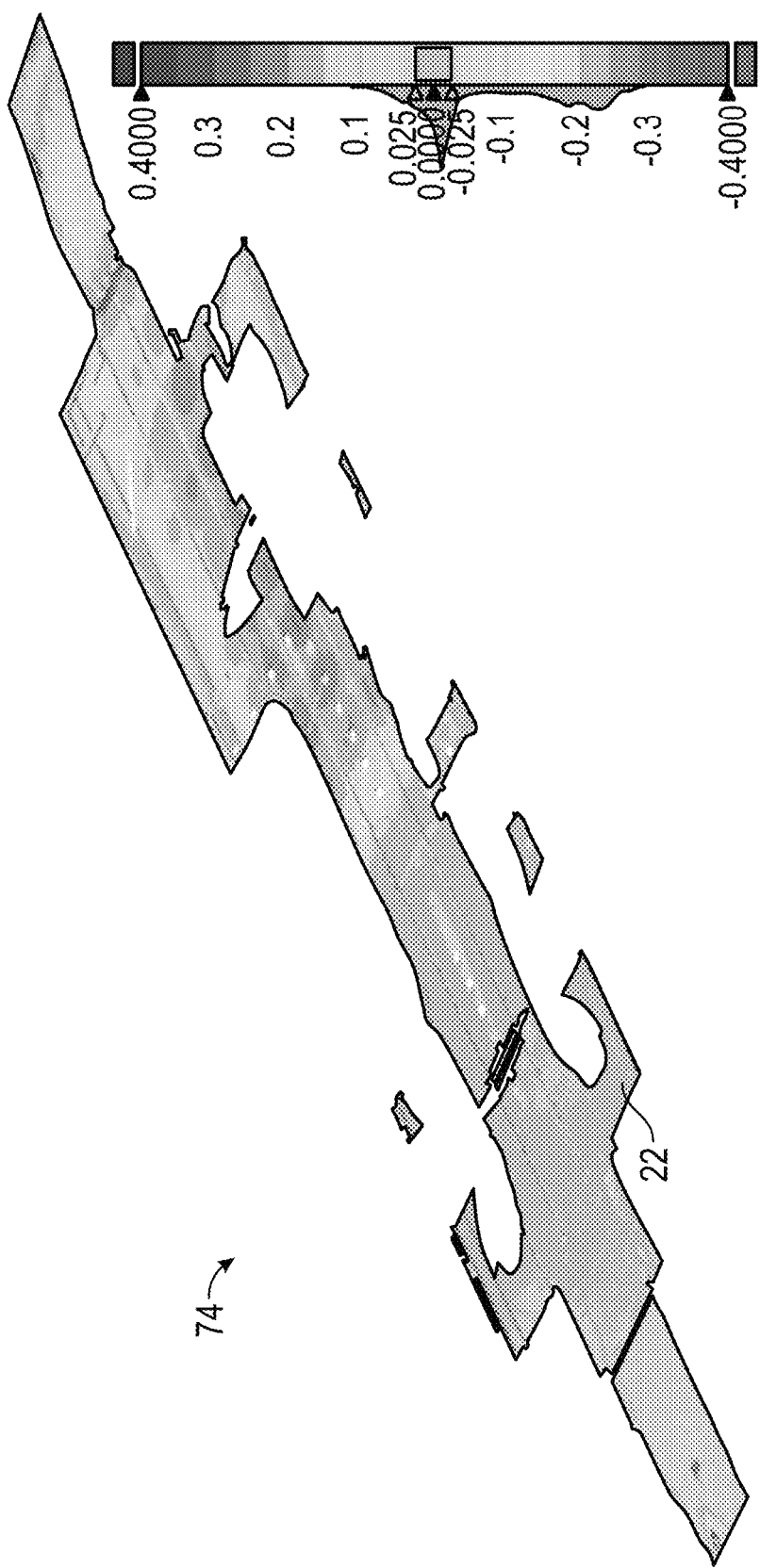
FIG. 37 illustrates a perspective view of a 3D direct compare contour plot of a cabin floor before and during flight at proximate maximum operating altitude in accordance with an exemplary embodiment.

In an exemplary embodiment, with the scan data aligned to the reference data using appropriate common datums, more specific analysis can be completed. FIG. 37 illustrates a 3D direct compare contour plot 74 of the cabin floor 22 before and during flight to isolate the shape variations due to flight loads. As illustrated, the surfaces of the cabin floor 22 move during flight of the aircraft (e.g., at an altitude of about 51,000 ft).

Figure 38:
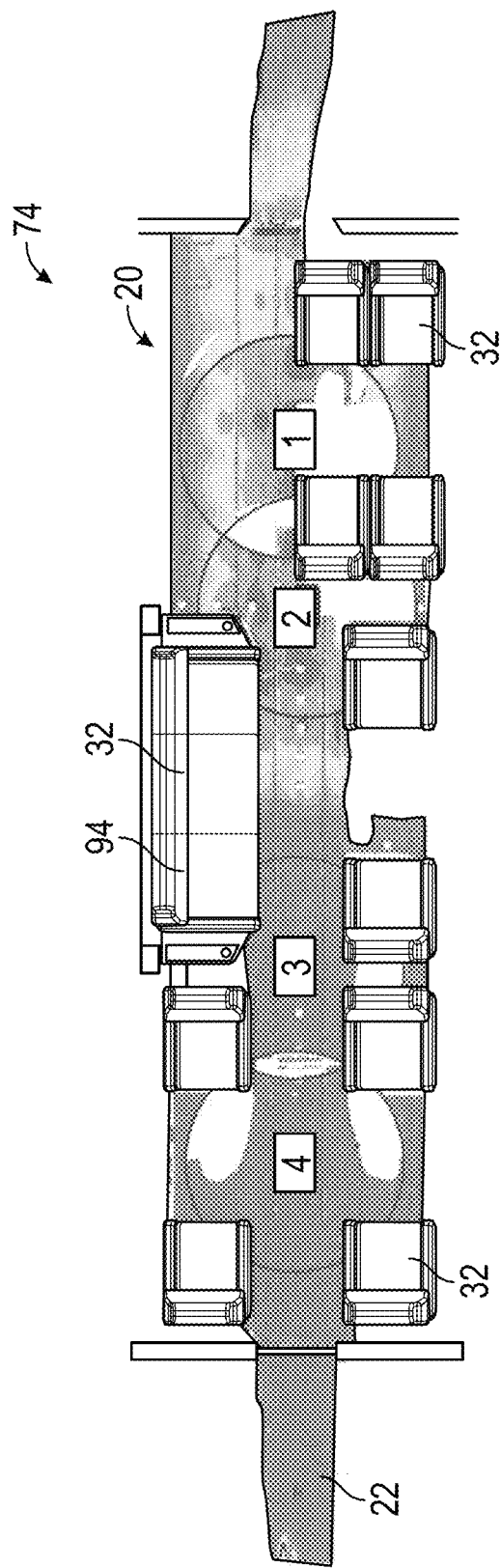
FIG. 38 illustrates a top view of a cabin floorboard contour plot with models for the furniture shown for reference in accordance with an exemplary embodiment.

FIG. 38 illustrates a top view of the floorboard contour plot 74 with models for the cabin furniture 32 shown for reference. In addition, four scan locations (1-4) are shown, with the circular shadow area under the 3D scanner at each location 1-4 indicated. Each subsequent scan collected scan data that may have been missed from previous scan, for example, because of the shadow area under the 3D scanner from the previous scan.

Figure 39:
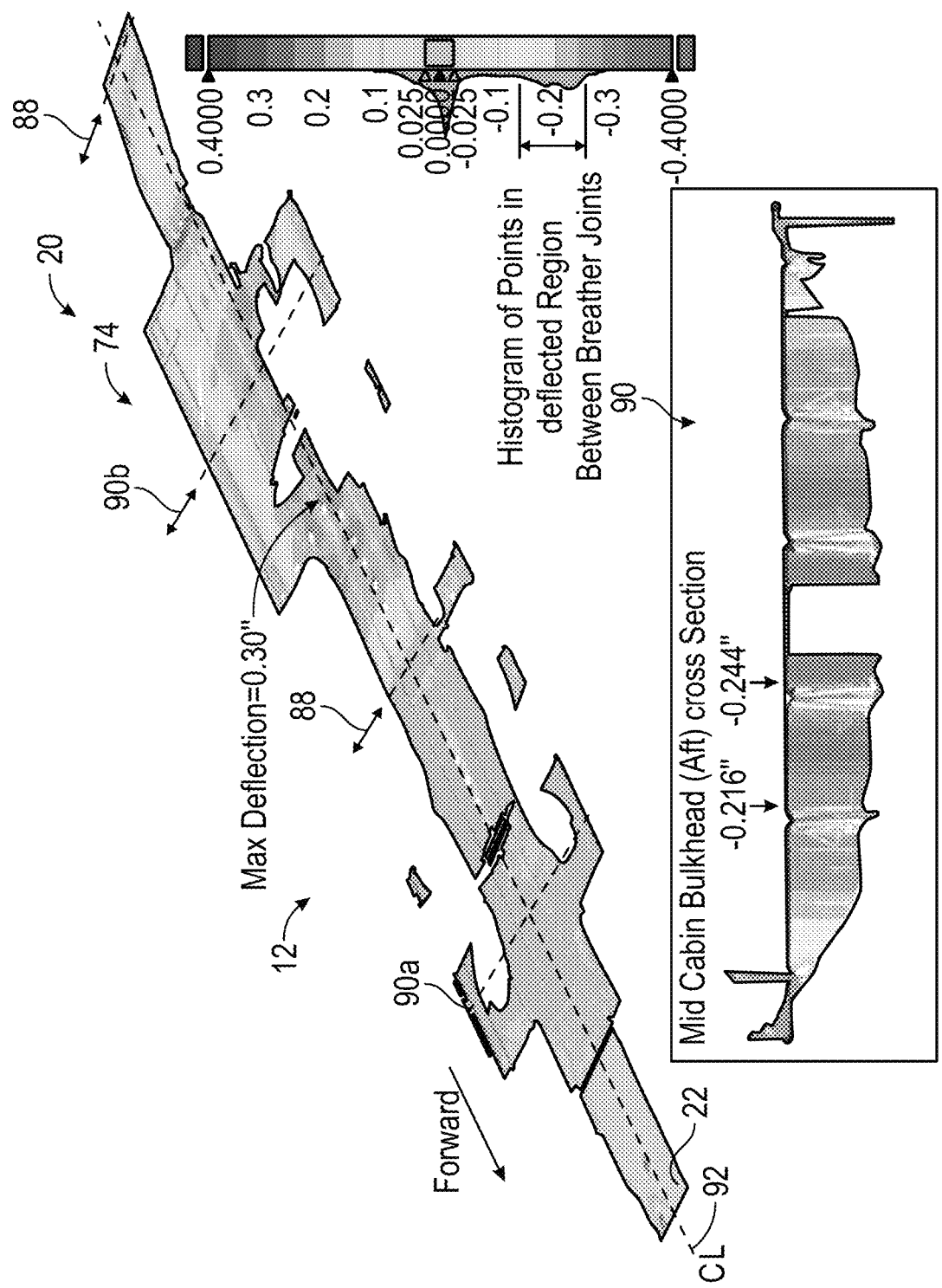
FIG. 39 illustrates a perspective view of the cabin floor contour plot showing floor deviation relative to key points in the cabin in accordance with an exemplary embodiment.

FIG. 39 illustrates a perspective view of the cabin floor contour plot 74 showing the cabin floor 22 deviation relative to key points in the cabin 20, including breather joints 88, mid cabin bulkheads 90a-b, and the aircraft centerline 92. In this example, the maximum deflection indicated is about 0.30 inches. As illustrated, a majority of the floorboard deformation occurs between the forward and aft breather joints 88. The area inside the fuselage 12 below the cabin floor 22 is open to the atmosphere (e.g., pressure cabin floor), so the differential pressure inside the cabin 20 can cause the cabin floor 22 to deform downward. The areas forward and aft of the breather joints 88 have equal pressure above and below the floorboard, so there is relatively little or no deformation of the cabin floor 22 caused by pressure differential.

FIGS. 38 and 39 illustrate how the cabin floor 22 moves in various parts of the cabin 20 in response to flight loads which is useful information to an interior furniture designer for detailed designs of the interior cabin furniture 32. For example, and as shown in FIGS. 38-39, a divan 94 is positioned across the forward breather joint 88 in which the aft inboard divan floor attachment moves downward, while the outboard and forward inboard attachments remain relatively flat during flight. If the interior furniture designer does not take this deformation into account for designing attachment scheme, the resulting divan 94 distortion can cause functional or aesthetic problems during flight.

Figure 40:
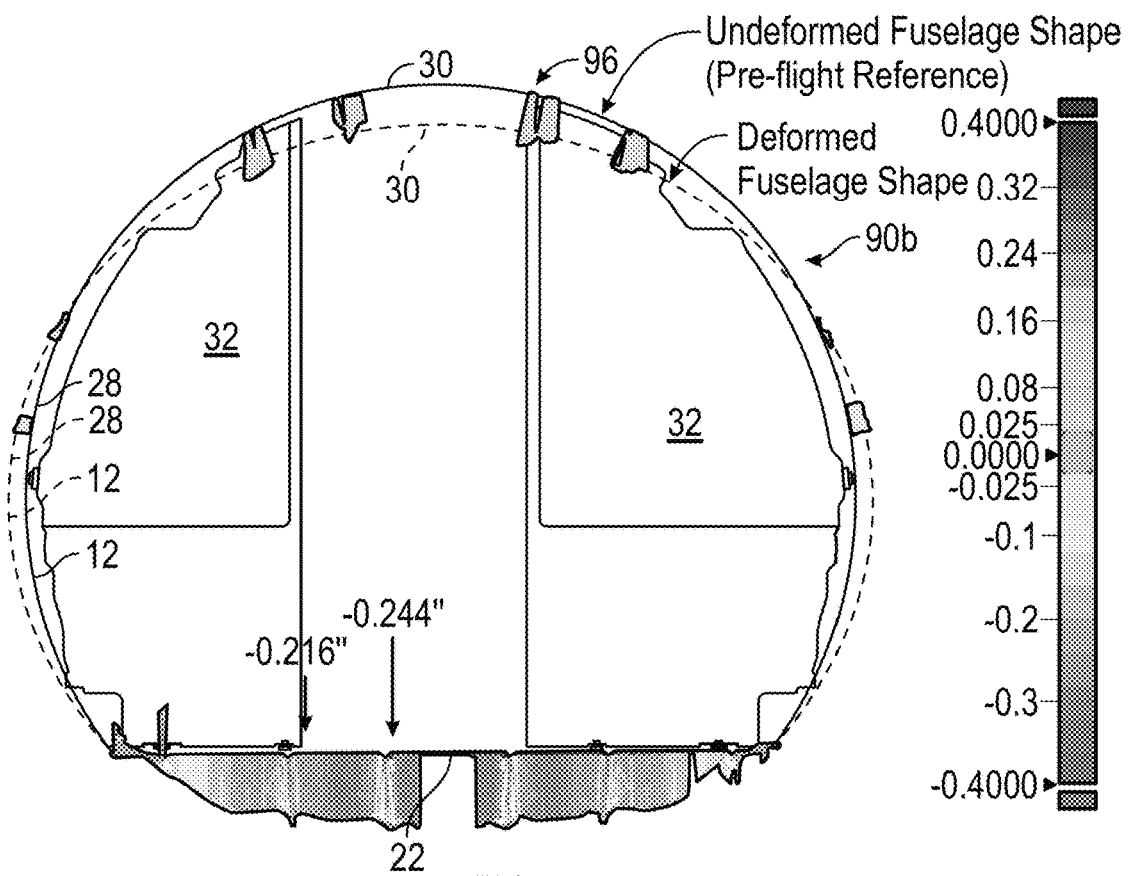
FIG. 40 is a whisker plot showing cabin floor and fuselage deformation at an aft mid cabin bulkhead location in accordance with an exemplary embodiment.

An example of a whisker plot 96 showing the cabin floor 22 and fuselage 12 deformation at the aft mid cabin bulkhead 90b is shown in FIG. 40, indicating movement relative to the reference data. As illustrated, the cabin floor 22 deformation is the same as shown FIG. 39 but with the addition of showing the deformation of key points along the sidewalls 28 and upper fuselage 30 to provide a more comprehensive view of how the overall shape of the fuselage 12 and cabin floor 22 change due to flight loads. The individual measurements around the perimeter of FIG. 40 are at scan target points used for scan data collection. Scan targets were attached to the fuselage 12 structure at these specific points because of the various surface textures used for interior sidewalls 28 and headliners 30 can sometimes provide irregular results. The dashed line was added along these points to approximate the deformed shape. The deformation illustrated in FIG. 40 is magnified 30x to emphasize the shape change.

Figure 41:
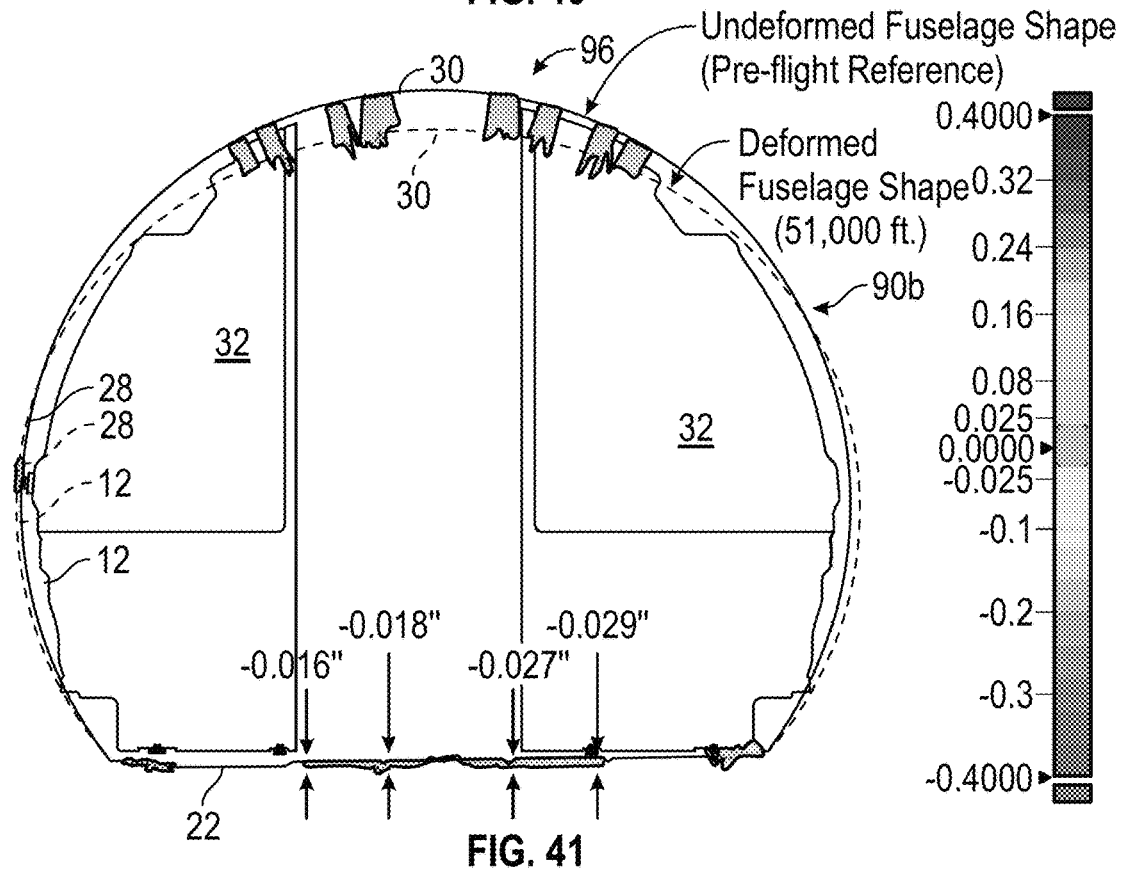
FIG. 41 is a whisker plot showing deformation at a forward mid cabin bulkhead location in accordance with an exemplary embodiment.

An example of a whisker plot 96 showing deformation at the forward mid cabin bulkhead location 90a is shown in FIG. 41. Comparing the location illustrated in FIG. 41 with the aft mid cabin bulkhead 90b location shown in FIG. 40, the forward mid cabin bulkhead 90a location has comparable deformation along the upper fuselage 30, but less deformation along the sidewalls 28 and relatively little or none along the cabin floor 22.

Figure 42:
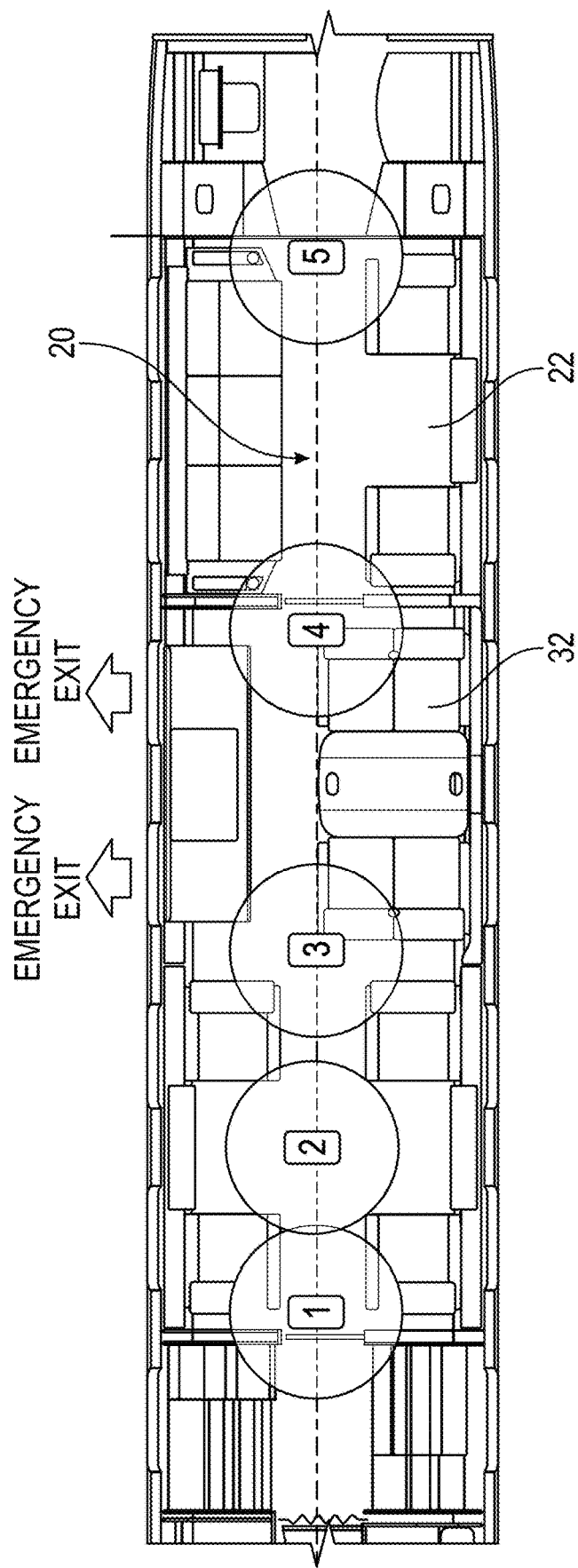
FIG. 42 illustrates a scan placement plan for positioning one or more 3D scanners in an interior portion of a fuselage of an aircraft in accordance with an exemplary embodiment.

In an exemplary embodiment, a full cabin scan analysis of the aircraft 10 was performed in which data for the full cabin scan was collected using the five scan positions (1-5) shown in FIG. 42 and the method 200 as discussed above. These scan positions 1-5 were selected to provide adequate cabin coverage, and to include the outboard cabin floor 22 surfaces between furniture assets. The outboard cabin floor 22 surfaces were used as datum references for scan alignment.

Figure 43:
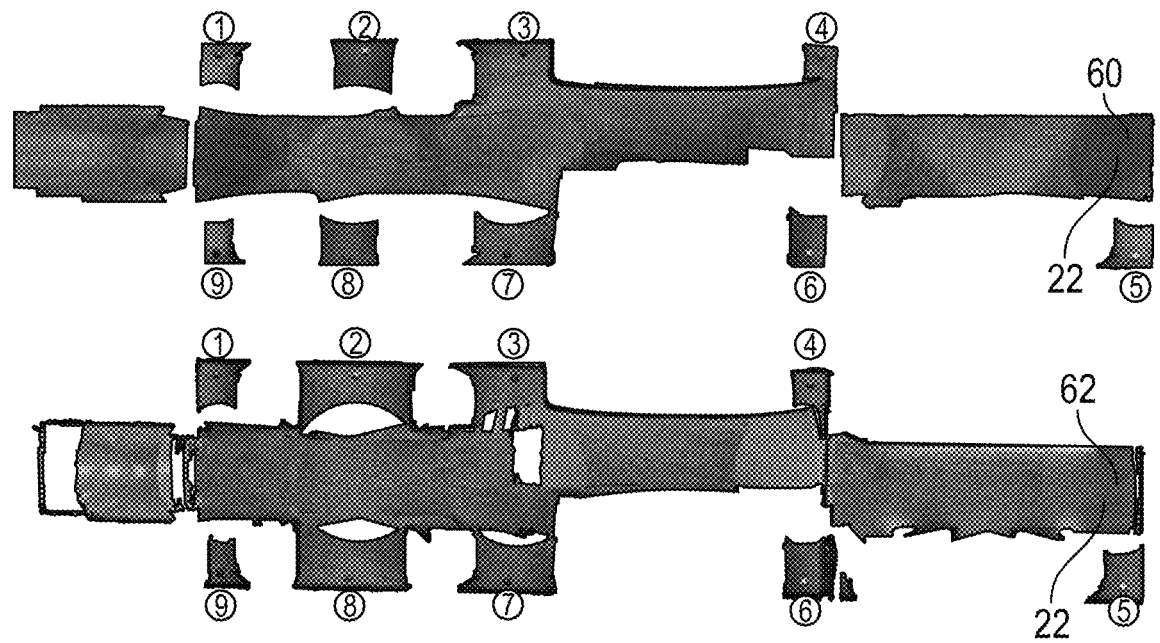
FIG. 43 illustrates a top view of alignment points for ground scan (top) and a proximate maximum operating altitude scan (bottom) in accordance with an exemplary embodiment.
Figure 44A:
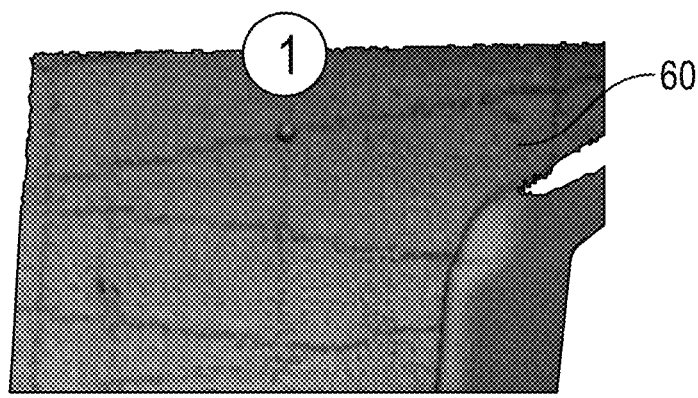
FIG. 44A is enlarged views of an alignment point for the ground scan depicted in FIG. 43.
Figure 44B:
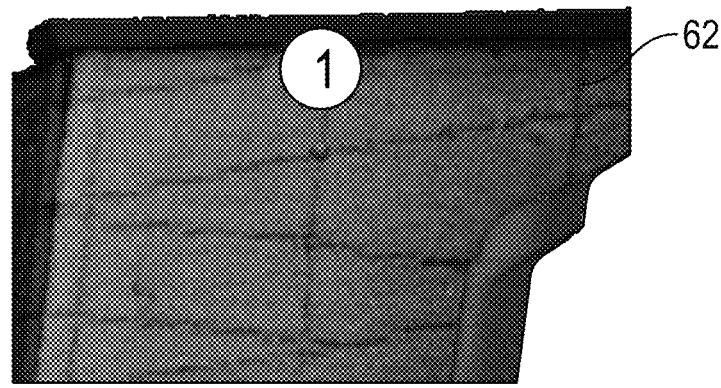
FIG. 44B is enlarged views of an alignment point for proximate maximum operating altitude scan depicted in FIG. 43.

The specific scan points (1-9) used to align the reference scan 60 (e.g., ground scan) and the deformed scan 62 (e.g., maximum operating altitude scan) are shown in FIG. 43. Each alignment scan point 1-9 is marked with a different colored dot, to highlight correspondence. To ensure consistent scan point selection, the carpet pattern was used to locate corresponding scan points from each scan as shown in FIG. 44, which illustrates the alignment scan point 1 for the reference scan 60 (top) and the deformed scan 62 (bottom). Alignment scan points near the outboard edges of the cabin floor 22 were used for alignment because these areas have relatively minimal deformation. The sidewalls and tops of the fuselage scan point clouds were moved with the cabin floor points when they were aligned, but only the cabin floor point region is shown in FIG. 43. When combining the two point clouds, it is advantageous to use a plurality of corresponding alignment scan points. A relatively larger number of correspondence alignment scan points facilitates reducing alignment error and improve the quality of the comparison. In an exemplary embodiment, a minimum of three correspondence alignment scan points is used for the software to align the point clouds, but more than three corresponding alignment scan points is preferred, such as, for example, five or more correspondence alignment scan points. In the illustrated embodiment shown in FIG. 43, because of the relatively large area to be aligned, nine corresponding alignment scan points 1-9 were used for the software to align the point clouds, one corresponding alignment point in each outboard cabin floor 22 area between furniture assets.

Figure 45:
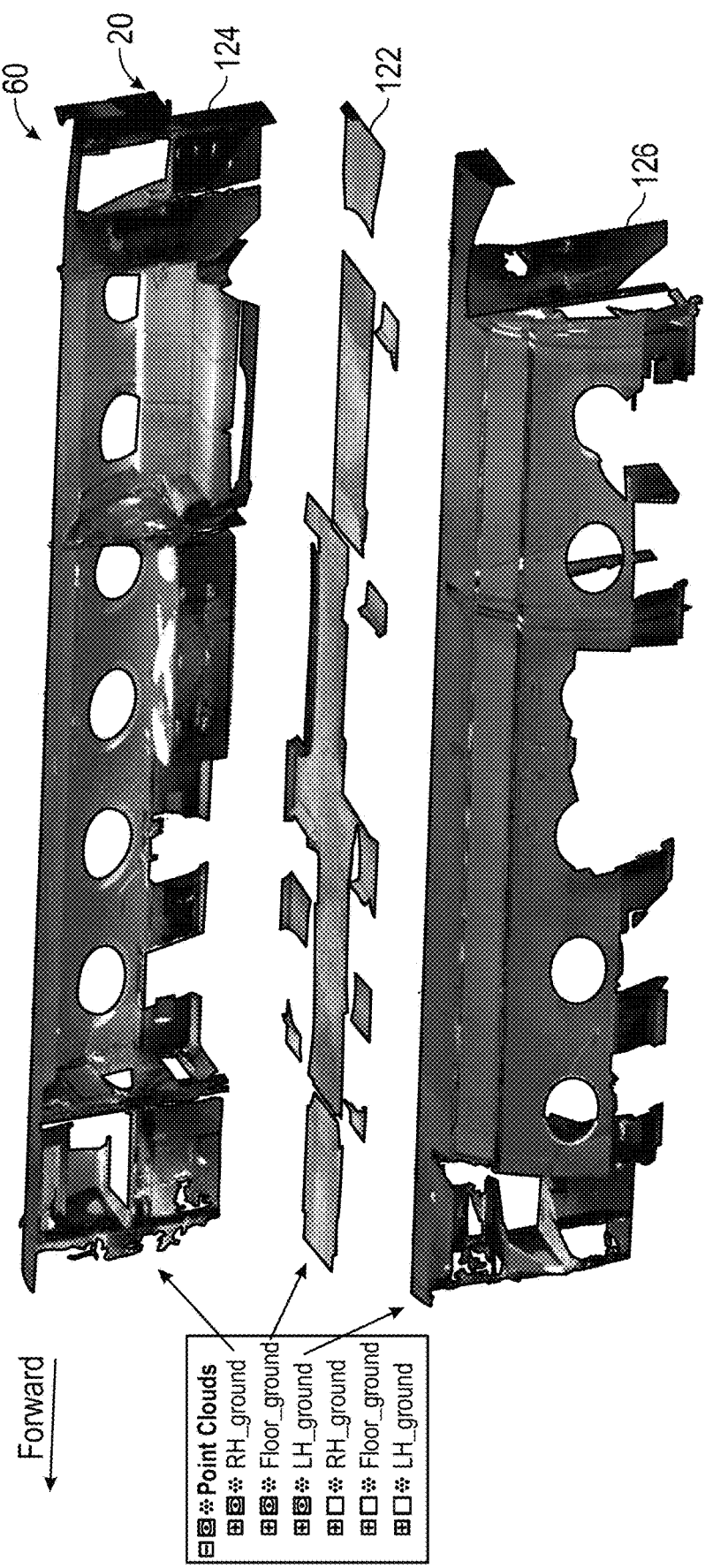
FIG. 45 are segregated point regions of a composite ground scan in accordance with an exemplary embodiment.

After the composite scans (e.g., the reference and deformed scans 60 and 62) were aligned, each scan is segregated to facilitate comparing specific areas of the cabin. The segregation for the reference scan 60 (e.g., ground scan) is shown in FIG. 45. The reference scan 60 is separated into cabin floor, right hand (RH), and left hand (LH) sections 122, 124, and 126 (e.g., point regions). The cabin seats have been removed from the scans, reference and deformed scans 60 and 62, because the cabin seats were manually repositioned during the flight, making comparison of the cabin seats irrelevant.

Figure 46:
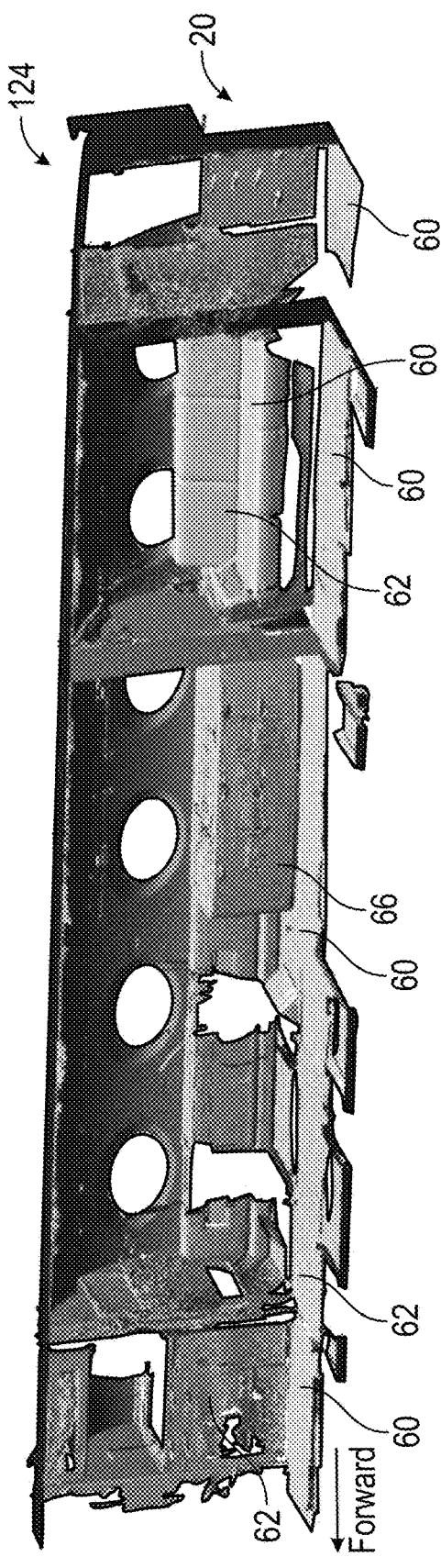
FIG. 46 is an overlay of ground and proximate maximum operating altitude scans of a right-hand side of a cabin in accordance with an exemplary embodiment.

An overlay of reference and deformed scans of the RH side 124 of the cabin 20 is shown in FIG. 46 with the scan interior color turned off. The reference scan 60 (e.g., ground scan) is shown in green and the deformed scan 62 (e.g., maximum operating altitude scan) is shown in blue. The blue areas 62 indicate surfaces that are in front, and green areas are behind, relative to the perspective shown in FIG. 46.

Figure 47:
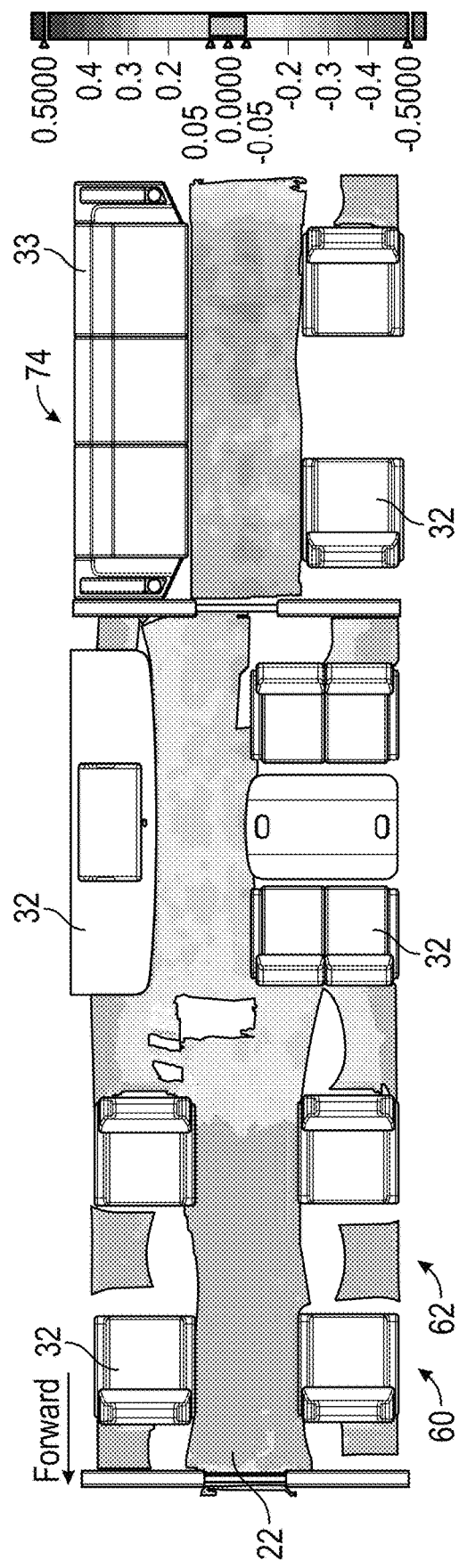
FIG. 47 is a deformation contour plot of a comparison of the ground and proximate maximum operating altitude scans with furniture assets using the same scan data from FIG. 46.
Figure 48:
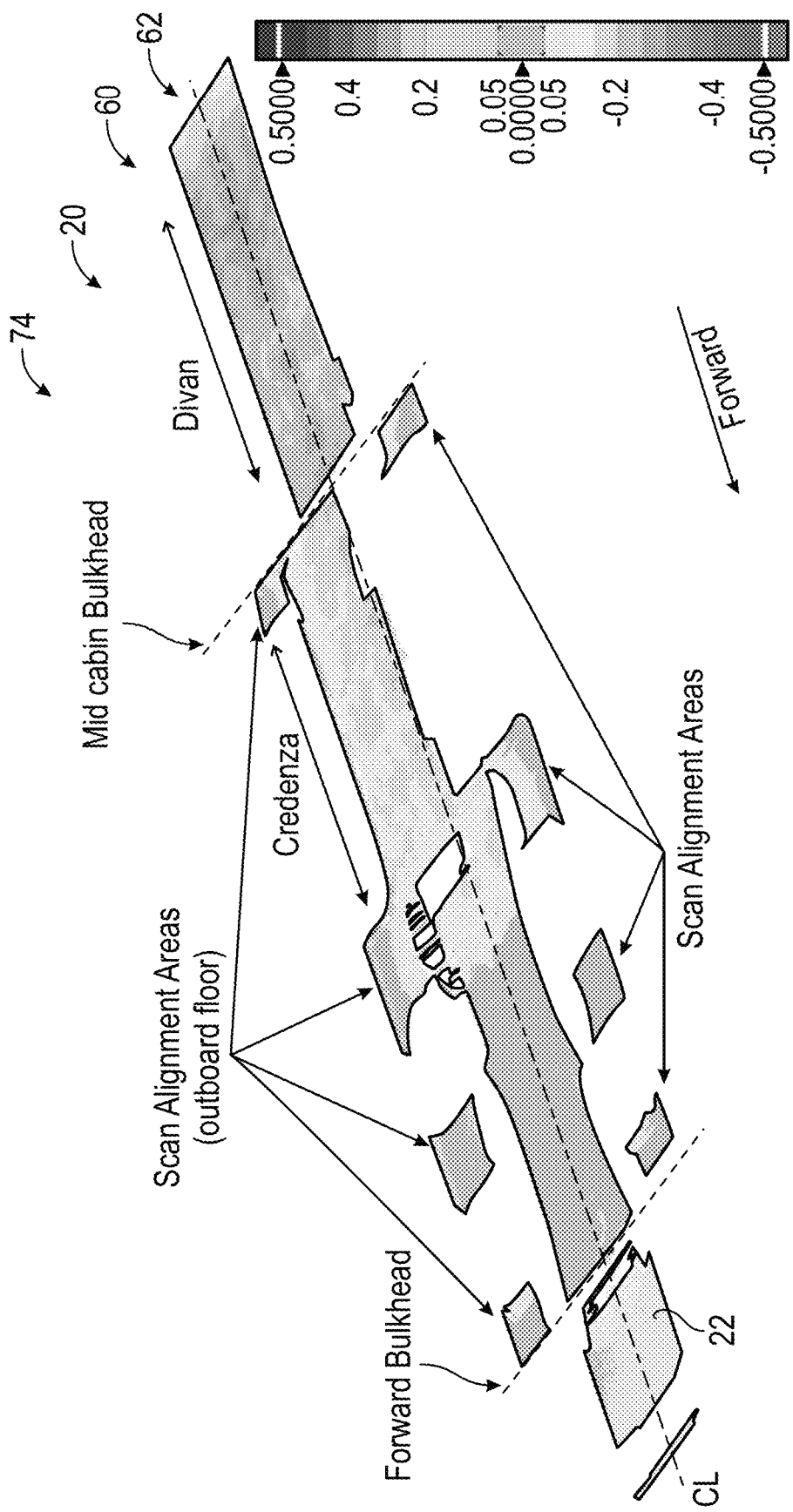
FIG. 48 is a deformation contour plot of a cabin floor depicted in FIG. 46 with bulkhead locations marked and without the furniture assets.

FIG. 47 is a deformation contour plot 74 of a comparison of the reference and deformed scans 60 and 62 made with the same scan data from FIG. 46 but showing the relative movement for the cabin floor 22 at about max operating altitude compared to the ground. The scale range in this comparison is +/−0.500 inches, with regions +/−0.050 inches shown in green. The furniture assets 32 are shown for reference. Another cabin floor deformation contour plot 74 is shown in FIG. 48 but without the furniture assets. The mid-cabin bulkhead, credenza, and divan locations are shown for reference. The scan alignment areas (in green) are also shown in FIG. 48.

Figure 49:
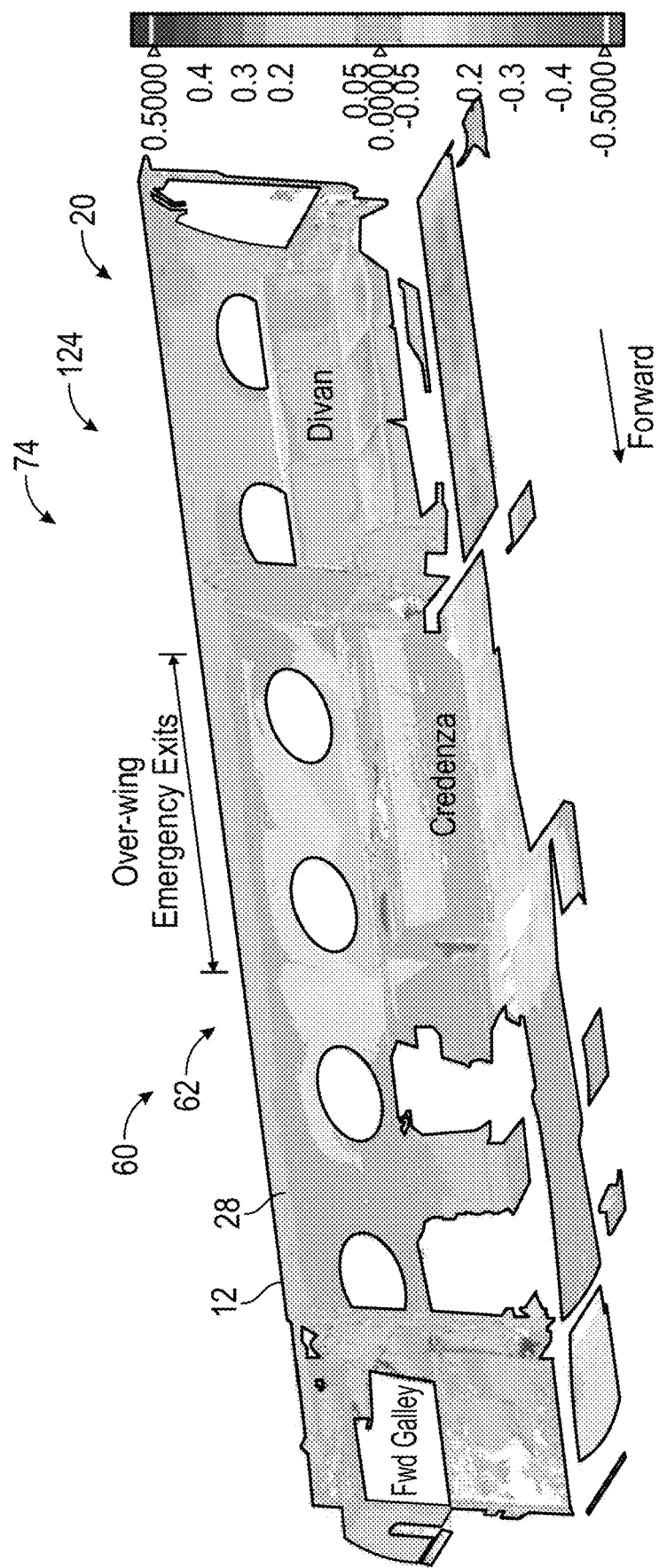
FIG. 49 is a deformation contour plot of ground and proximate maximum operating altitude scans of a right-hand side of a cabin with furniture assets in accordance with an exemplary embodiment.

FIG. 49 is a deformation contour plot 74 of a comparison of the reference and deformed scans 60 and 62 of the RH side 124 of the cabin 20. The scale range in this comparison is +/−0.500 inches with the majority of regions (e.g., green region) indicating minimal movement (<0.050 inches). The regions showing the most movement are: 1) the cabin floor 22 in the aft half portion of the cabin 20, 2) the sidewall 28 of the fuselage 12 around the over-wing emergency exits, and 3) the headliner in the middle portion of the cabin 20.

Figure 50:
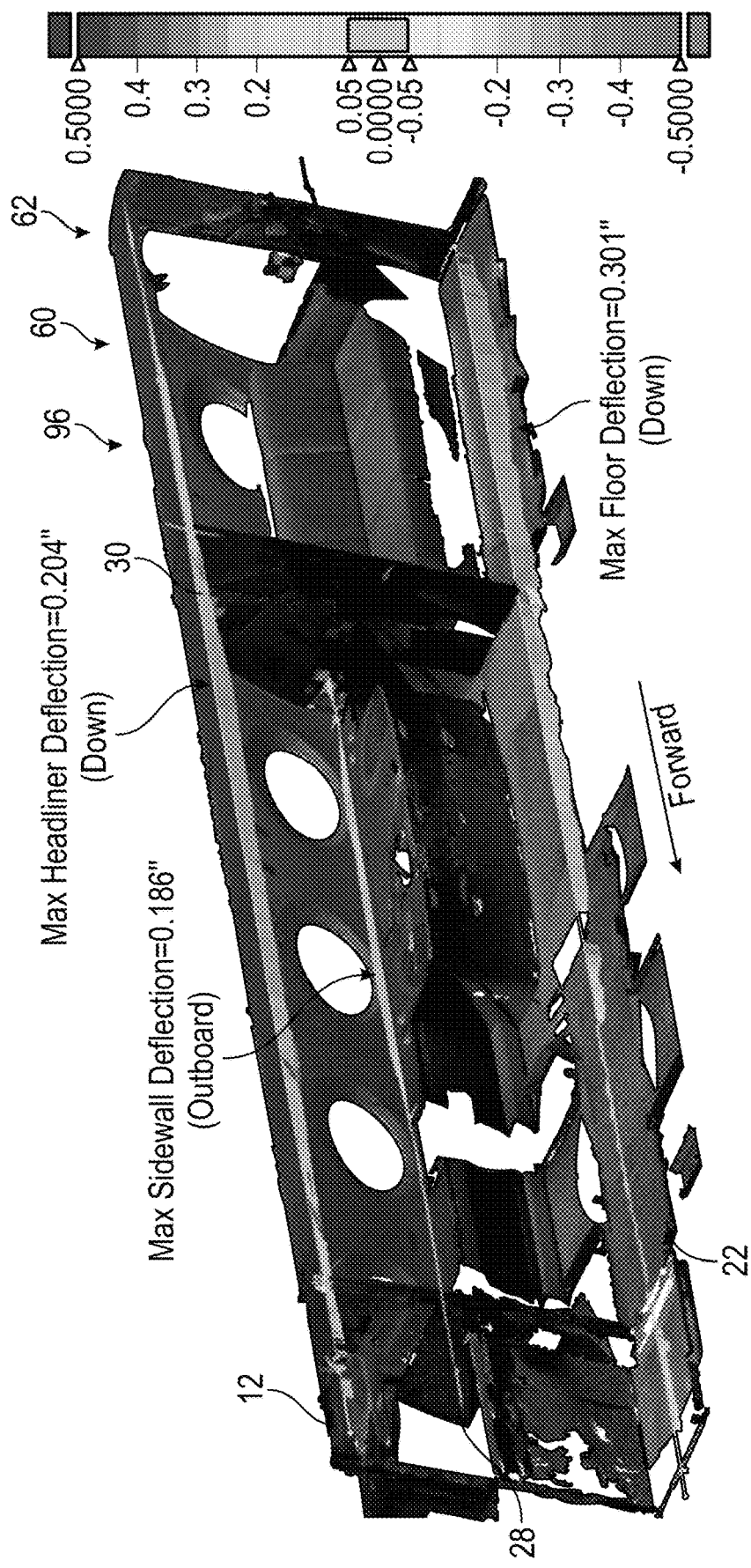
FIG. 50 is a longitudinal 2D whisker plot of deformation including a cabin floor, sidewall of a fuselage, and headliner in accordance with an exemplary embodiment.
Figure 51A:
FIG. 51A is a lateral 2D whisker plot of deformation including divan area in a cabin in accordance with an exemplary embodiment.
Figure 51A:
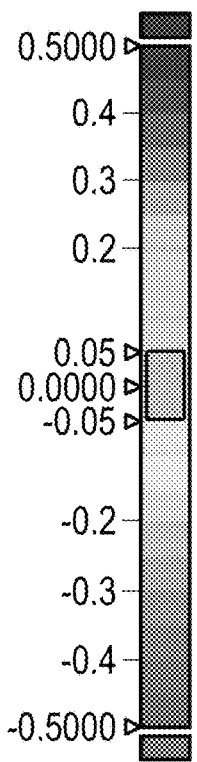
Figure 51B:
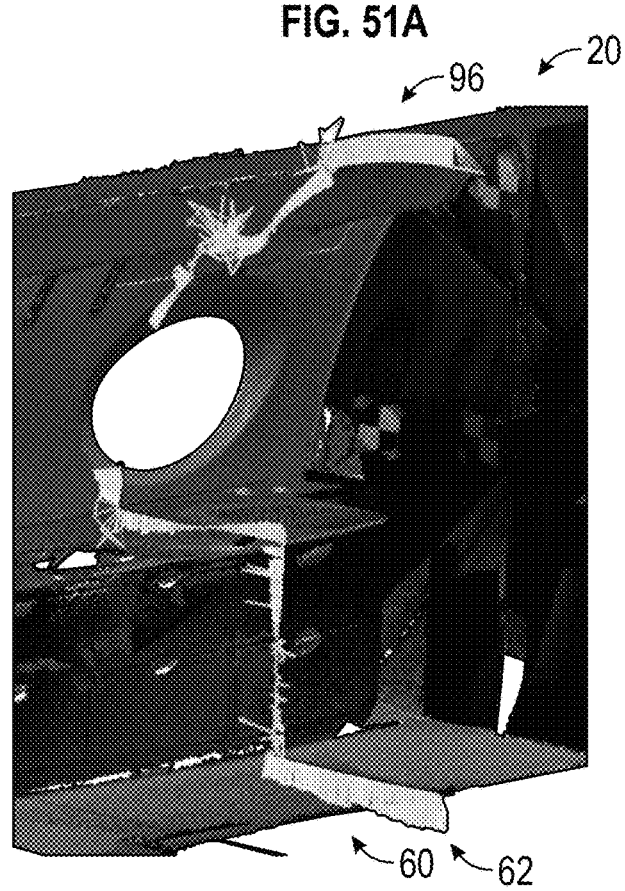
FIG. 51B is a 2D whisker plots showing deformation of a credenza area in a cabin in accordance with an exemplary embodiment.
Figure 51B:
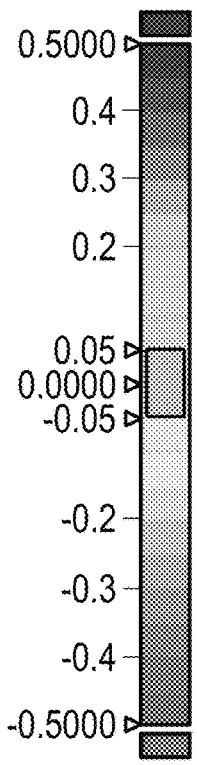

FIG. 50 is a longitudinal 2D whisker plot 96 of significant deformation including the cabin floor 22, sidewall 28 of the fuselage 12, and headliner 30. The maximum deflection for each of the sections is indicated. FIGS. 51A-51B are lateral 2D whisker plots 96 depicting the credenza and divan areas, respectively.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A method for characterizing shape changes of an interior portion of an aircraft from flight loads, the method comprising the steps of:
    positioning one or more 3D scanners within the interior portion of the aircraft;
    creating a reference scan of the interior portion with the one or more 3D scanners while the aircraft is substantially stationary and/or on the ground;
    creating a deformed scan of the interior portion with the one or more 3D scanners while the aircraft is in flight subject to substantial flight loads; and
    postprocessing and analyzing the reference scan and the deformed scan to characterize the shape changes of the interior portion of the aircraft from the substantial flight loads.

2. The method of claim 1, wherein creating the reference scan comprises generating the reference scan including a reference point cloud that includes reference scan points, wherein creating the deformed scan comprises generating the deformed scan including a deformed point cloud that includes deformed scan points, and wherein postprocessing and analyzing comprises:
    converting the reference scan points from the reference scan to a mesh to define a reference mesh; and
    using the reference mesh to calculate distances from the deformed scan points to the reference scan points.

3. The method of claim 2, further comprising the step of adding scan targets to the interior portion of the aircraft, wherein creating the reference scan includes scanning the scan targets to generate the reference scan including the scan targets represented by a first portion of the reference scan points, wherein creating the deformed scan include scanning the scan targets to generate the deformed scan including the scan targets represented by a second portion of the deformed scan points, and wherein postprocessing and analyzing comprises:
    aligning the deformed scan with the reference scan including the reference mesh using the scan targets.

4. The method of claim 3, wherein aligning includes using centers of the scan targets for aligning the deformed scan with the reference scan.

5. The method of claim 3, wherein postprocessing and analyzing comprises refining vertical alignment of the deformed scan and the reference scan using a selected portion of the scan targets.

6. The method of claim 5, wherein postprocessing and analyzing comprises creating a comparison plot of the reference scan and the deformed scan.

7. The method of claim 6, wherein creating the comparison plot includes creating a contour plot of the reference scan and the deformed scan.

8. The method of claim 6, wherein creating the comparison plot includes creating a whisker plot of the reference scan and the deformed scan.

9. The method of claim 6, wherein creating the comparison plot includes creating the comparison plot including corresponding point regions of the reference scan and the deformed scan.

10. The method of claim 6, wherein postprocessing and analyzing comprises analyzing the comparison plot to determine magnitude and direction of one or more of the shape changes of the interior portion of the aircraft from the substantial flight loads.

11. The method of claim 1, wherein postprocessing and analyzing comprises creating a validation scan of the interior portion of the aircraft using dimensionally defined scan elements; and
postprocessing and analyzing the reference scan and the validation scan for defining the effectiveness for characterizing the shape changes of the interior portion of the aircraft from the substantial flight loads.

12. A method for characterizing shape changes of an interior portion of an aircraft from flight loads, the method comprising the steps of:
determining scan locations within the interior portion of the aircraft;
scanning the interior portion with one or more 3D scanners positioned at the scan locations while the aircraft is substantially stationary and/or on the ground for creating a reference scan;
scanning the interior portion with the one or more 3D scanners positioned at the scan locations while the aircraft is in flight subject to substantial flight loads for creating a deformed scan; and
postprocessing and analyzing the reference scan and the deformed scan to characterize the shape changes of the interior portion of the aircraft from the substantial flight loads.

13. The method of claim 12, wherein the one or more 3D scanners includes a phase shift scanner, wherein scanning while the aircraft is substantially stationary and/or on the ground includes scanning the interior portion with the phase shift scanner for creating the reference scan, and wherein scanning while the aircraft is in flight includes scanning the interior portion with the phase shift scanner for creating the deformed scan.

14. The method of claim 12, wherein the one or more 3D scanners includes a triangulation scanner, wherein scanning while the aircraft is substantially stationary and/or on the ground includes scanning the interior portion with the triangulation scanner for creating the reference scan, and wherein scanning while the aircraft is in flight includes scanning the interior portion with the triangulation scanner for creating the deformed scan.

15. The method of claim 12, further comprising the step of:
adding scan targets to the interior portion of the aircraft prior to scanning the interior portion of the aircraft.

16. The method of claim 15, wherein scanning while the aircraft is substantially stationary and/or on the ground includes scanning the interior portion of the aircraft including the scan targets to generate reference point clouds, and wherein scanning while the aircraft is in flight includes scanning the interior portion of the aircraft including the scan targets to generate deformed point clouds.

17. The method of claim 16, further comprising the steps of:
processing the reference point clouds and the deformed point clouds including assigning one of color values, altitude values, and a combination of color and altitude values to each of the reference point clouds and the deformed point clouds.

18. The method of claim 16, further comprising the steps of:
registering the reference point clouds to form a combined reference point cloud; and
registering the deformed point clouds to form a combined deformed point cloud.

19. The method of claim 18, further comprising the steps of:
filtering the combined reference point cloud and the combined deformed point cloud to remove stray points and clusters from the combined reference point cloud and the combined deformed point cloud;
smoothing the combined reference point cloud and the combined deformed point cloud to reduce roughness of outer shapes of the combined reference point cloud and the combined deformed point cloud which correspond to surfaces of the interior portion of the aircraft; and
sampling the combined reference point cloud and the combined deformed point cloud to reduce a total number of scan points for each of the combined reference point cloud and the combined deformed point cloud.

20. The method of claim 19, further comprising the step of:
segmenting each of the combined reference point cloud and the combined deformed point cloud into point regions to facilitate comparing the combined reference point cloud and the combined deformed point cloud for characterizing the shape changes of the interior portion of the aircraft from flight loads, wherein segmenting occurs after filtering, smoothing, and sampling the combined reference point cloud and the combined deformed point cloud.

* * * * *